（12）United States Patent
Tsukahara et al.

(10) Patent No.: US 10,054,061 B2
(45) Date of Patent: Aug. 21, 2018

(54) FOUR-CYLINDER ENGINE AND METHOD OF OPERATING FOUR-CYLINDER ENGINE

(71) Applicant: YAMAHA HASUDOKI KABUSHIKI KAISHA, Iwata-shi, Shizuoka (JP)

(72) Inventors: Ei Tsukahara, Shizuoka (JP); Daijiro Tanaka, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 186 days.

(21) Appl. No.: 15/110,527

(22) PCT Filed: Jan. 10, 2014

(86) PCT No.: PCT/JP2014/050304
§ 371 (c)(1),
(2) Date: Jul. 8, 2016

(87) PCT Pub. No.: WO2015/104831
PCT Pub. Date: Jul. 16, 2015

(65) Prior Publication Data
US 2016/0333801 A1 Nov. 17, 2016

(51) Int. Cl.
*F02D 9/00* (2006.01)
*F02D 9/02* (2006.01)
(Continued)

(52) U.S. Cl.
CPC ............... *F02D 9/02* (2013.01); *F02B 75/18* (2013.01); *F02D 13/0226* (2013.01);
(Continued)

(58) Field of Classification Search
CPC ...... F02D 9/02; F02D 41/008; F02D 41/0002; F02D 41/18; F02D 13/0226;
(Continued)

(56) References Cited

U.S. PATENT DOCUMENTS 5,282,397 A * 2/1994 Harkness ............... F02B 75/16
123/192.1
5,715,794 A * 2/1998 Nakamura ............. F02D 21/08
123/305
(Continued)

FOREIGN PATENT DOCUMENTS

EP 1 435 446 A2 7/2004
EP 2 000 378 A1 12/2008
(Continued)

OTHER PUBLICATIONS

Official Communication issued in International Patent Application No. PCT/JP2014/050304, dated Mar. 4, 2014.

*Primary Examiner* — Hieu T Vo
*Assistant Examiner* — Sherman Manley
(74) *Attorney, Agent, or Firm* — Keating and Bennett, LLP

(57) ABSTRACT

An engine includes a cylinder body, a cylinder head, and an ignition device including spark plugs. The engine also includes an intake device connected to intake ports, an exhaust device connected to exhaust ports, pistons, and a crankshaft connected to the pistons by connecting rods. Explosion intervals of the cylinders are 270°, 180°, 90°, and 180° as crank angles. The engine further includes a discomfort eliminator which, when the engine speed is lower than a predetermined value, makes the indicated mean effective pressure of at least one of two cylinders having an explosion interval of 90° lower than the indicated mean effective pressures of the other cylinders having an explosion interval of not 90°. The engine causes unequal-interval explosions but produces little change in the driving energy per unit time during an operating state in which an occupant is liable to feel torque fluctuations.

12 Claims, 17 Drawing Sheets

(51) Int. Cl.
*F02M 35/10* (2006.01)
*F02D 13/02* (2006.01)
*F02D 41/00* (2006.01)
*F02D 41/18* (2006.01)
*F02P 5/15* (2006.01)
*F02B 75/22* (2006.01)
*F02B 75/18* (2006.01)
*F02D 11/10* (2006.01)
*F02B 75/20* (2006.01)

(52) U.S. Cl.
CPC ....... *F02D 41/0002* (2013.01); *F02D 41/008* (2013.01); *F02D 41/18* (2013.01); *F02M 35/10045* (2013.01); *F02M 35/10386* (2013.01); *F02P 5/1512* (2013.01); *F02B 75/20* (2013.01); *F02B 75/22* (2013.01); *F02B 2075/1816* (2013.01); *F02D 11/105* (2013.01); *F02D 2041/001* (2013.01); *F02D 2200/101* (2013.01); *F02D 2250/28* (2013.01); *Y02T 10/18* (2013.01); *Y02T 10/42* (2013.01); *Y02T 10/46* (2013.01)

(58) Field of Classification Search
CPC ............. F02D 2200/101; F02D 11/105; F02D 2041/001; F02B 75/18; F02B 75/20; F02B 75/22; F02B 2075/1816; F02P 5/1512; F02M 35/10386; F02M 35/10045; Y02T 10/18; Y02T 10/46; Y02T 10/42
See application file for complete search history.

(56) References Cited

U.S. PATENT DOCUMENTS

| | | | | |
|---|---|---|---|---|
| 5,738,074 A * | 4/1998 | Nakamura | ............ | F02D 35/023 123/305 |
| 6,273,064 B1 * | 8/2001 | Scholl | ................ | G01L 23/222 123/406.24 |
| 6,286,482 B1 * | 9/2001 | Flynn | ..................... | F02B 1/12 123/25 C |
| 7,073,485 B2 * | 7/2006 | Truscott | ............... | F02D 35/023 123/406.22 |
| 7,810,469 B2 * | 10/2010 | Vigild | ................. | F02D 35/027 123/406.26 |
| 7,874,279 B2 * | 1/2011 | Fukami | ................. | B60K 6/485 123/399 |
| 8,047,175 B2 * | 11/2011 | Nishi | ..................... | F16F 15/24 123/192.1 |
| 8,857,399 B2 * | 10/2014 | Colonna | .............. | F16F 15/265 123/192.2 |
| 9,695,761 B2 * | 7/2017 | Bizub | ................. | F02D 35/027 |
| 9,791,343 B2 * | 10/2017 | Bizub | ................. | G01L 23/225 |
| 9,850,826 B2 * | 12/2017 | Ryu | ........................ | F02D 13/06 |
| 9,933,334 B2 * | 4/2018 | Rivellini | ............... | G01M 15/05 |
| 2004/0168655 A1 * | 9/2004 | Hitomi | ..................... | F01L 1/185 123/58.8 |
| 2006/0157024 A1 * | 7/2006 | Tomii | ........................ | F02D 9/02 123/346 |
| 2010/0162803 A1 * | 7/2010 | Scafati | ................... | G01M 15/11 73/114.16 |
| 2012/0210960 A1 | 8/2012 | Kirchweger et al. | | |
| 2013/0206108 A1 * | 8/2013 | Schule | ............... | F02D 13/0226 123/435 |
| 2013/0211694 A1 * | 8/2013 | Taglialatela | .......... | F02P 5/1502 701/105 |
| 2014/0046571 A1 * | 2/2014 | Cowgill | ............. | F02D 41/0085 701/102 |
| 2014/0311441 A1 * | 10/2014 | Lach | ..................... | F16F 15/322 123/197.4 |
| 2015/0051813 A1 * | 2/2015 | Ramundo | ........... | F02D 41/3005 701/104 |

FOREIGN PATENT DOCUMENTS

| | | |
|---|---|---|
| JP | 09-072232 A | 3/1997 |
| JP | 2001-041084 A | 2/2001 |
| JP | 2006-249998 A | 9/2006 |
| JP | 2008-014194 A | 1/2008 |
| JP | 1533846 B2 | 9/2010 |

* cited by examiner

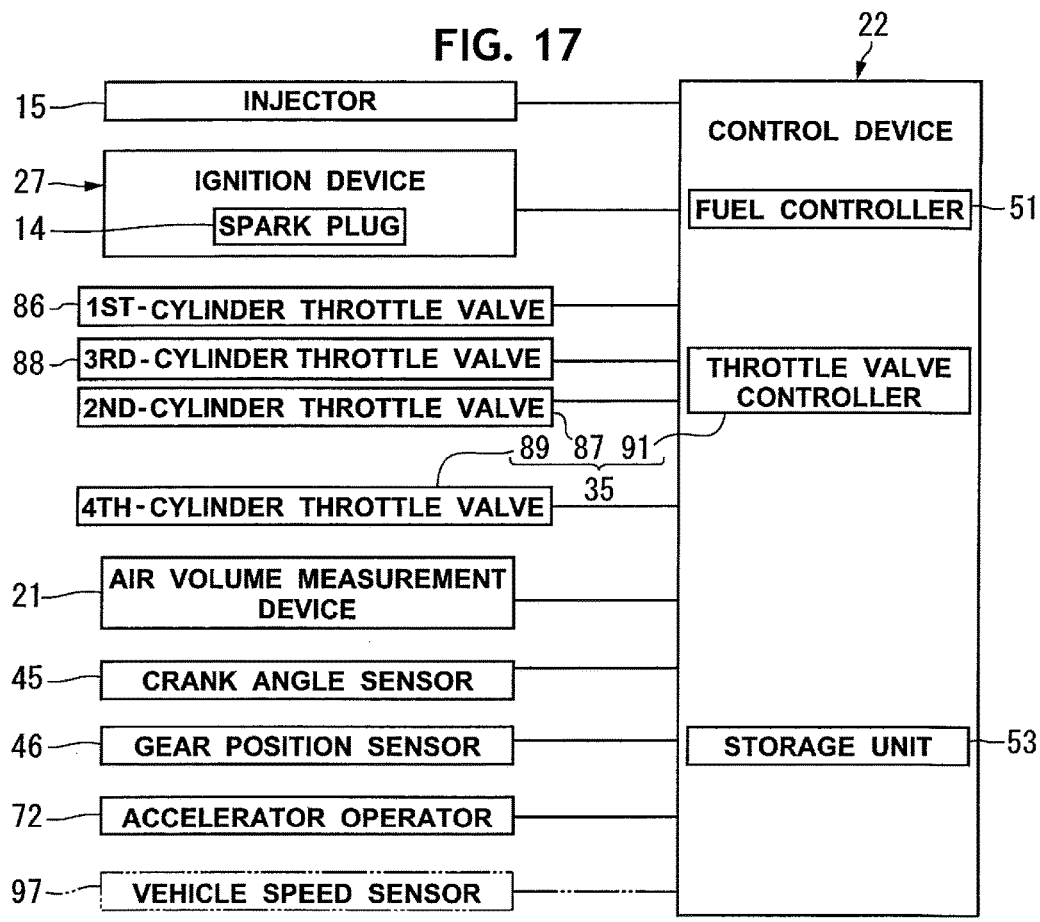
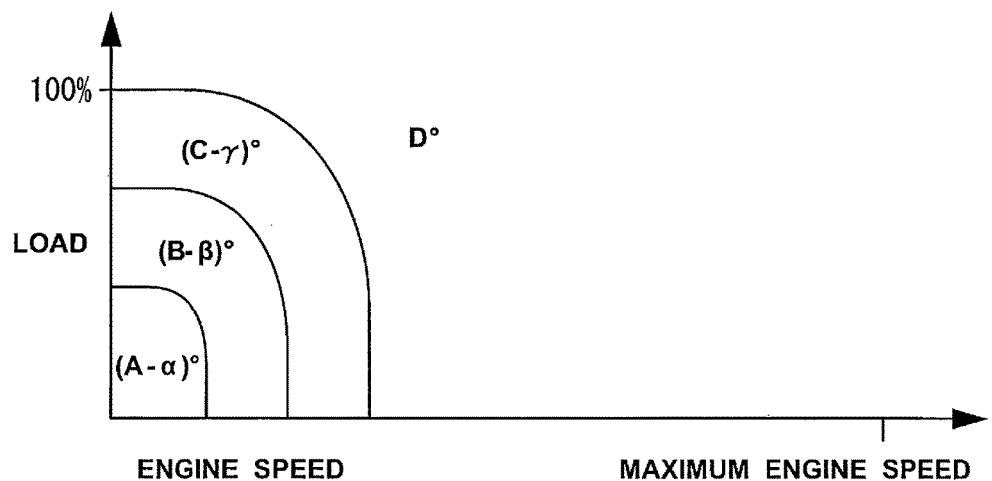

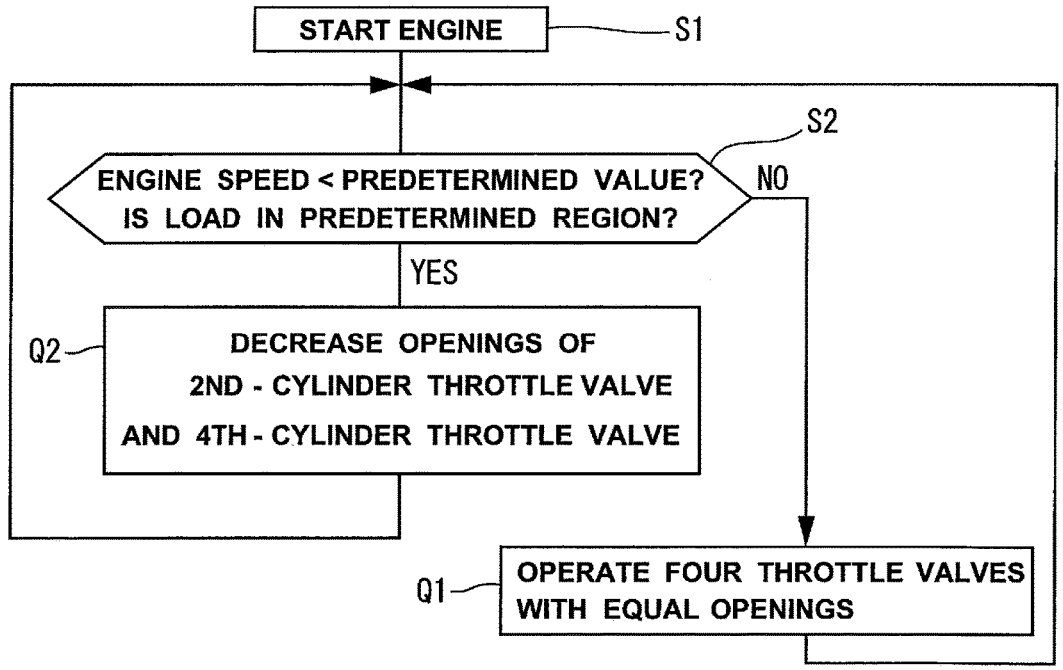
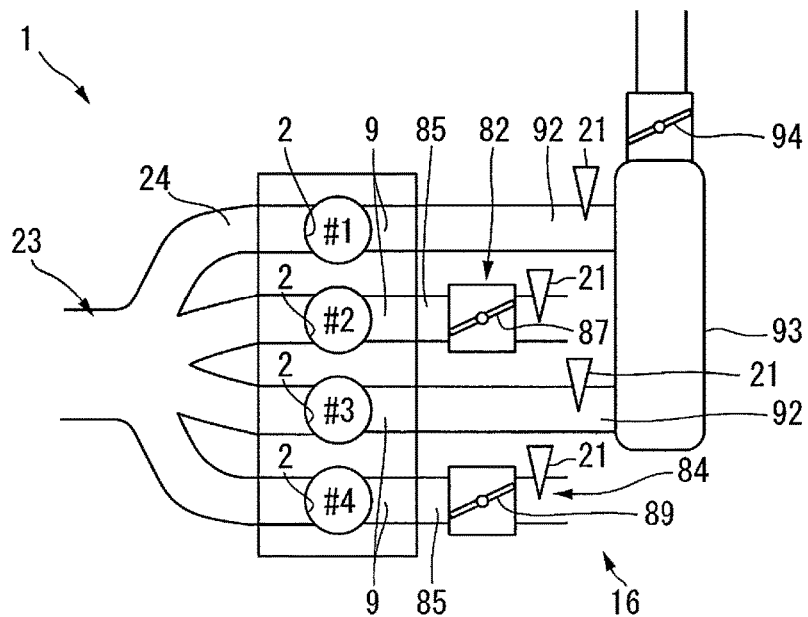

FOUR-CYLINDER ENGINE AND METHOD OF OPERATING FOUR-CYLINDER ENGINE

BACKGROUND OF THE INVENTION

1. Field of the Invention

The present invention relates to a four-cylinder engine in which the explosion intervals of four cylinders are 270°, 180°, 90°, and 180° as crank angles, and a method of operating the four-cylinder engine.

2. Description of the Related Art

As a crankshaft of a four-cylinder engine mounted in a vehicle, a one-plane-type crankshaft (180° crankshaft) in which four crank pins are positioned on one virtual plane and a two-plane-type crankshaft are described in Japanese Patent No. 4533846. Crank pins of the two-plane-type crankshaft are arranged two by two on two virtual planes perpendicular to each other when viewed in the axial direction of the crankshaft.

It is known that a vehicle equipped with a four-cylinder engine using the two-plane-type crankshaft of this kind or a V-type four-cylinder engine including the one-plane-type crankshaft gives an occupant the feeling that an accelerator operation and the behavior of the vehicle body match. This is so probably because this crank layout removes most of the inertial torque of the engine. The explosion intervals of the four-cylinder engine of this kind are often 270°, 180°, 90°, and 180° as crank angles.

The combustion pressure and generated torque of the four-cylinder engine as described above change as shown in FIG. 28. In FIG. 28, the abscissa indicates the crank angle, and the ordinate indicates the combustion pressure and generated torque. Also, FIG. 28 shows an example of a case in which the ignition order is first cylinder→third cylinder-→second cylinder→fourth cylinder. In this case, when explosion occurs in the first cylinder at a crank angle indicated by A in FIG. 28, explosion occurs in the third cylinder at crank angle B advanced 270° from crank angle A. Then, the crankshaft further rotates 180°, and explosion occurs in the second cylinder at crank angle C. After that, the crankshaft rotates 90°, and explosion occurs in the fourth cylinder at crank angle D. When the crankshaft further rotates 180° and reaches crank angle E after that, explosion occurs in the first cylinder again. On the other hand, torque generated on the output shaft of this four-cylinder engine rises at the same intervals as the explosion intervals. That is, torque is generated at unequal intervals corresponding to the unequal-interval explosions.

A four-cylinder engine in which the explosion intervals are 270°, 180°, 90°, and 180° as crank angles poses a problem when the engine speed is low. This problem is that an occupant of a vehicle equipped with the engine of this kind feels a sense of discomfort. The main cause of this sense of discomfort is that the explosion intervals of the four cylinders are unequal so the driving energy per unit time becomes non-uniform. The driving energy herein mentioned is energy that rotates the output shaft of the engine (and the driving wheels of the vehicle). The magnitude of torque to be applied to the output shaft changes in proportion to the magnitude of the driving energy.

The above-described torque rises twice within a short time when explosions occur in two cylinders having an explosion internal of 90° as a crank angle. The torque rises twice within a short time as described above when, for example, explosion occurs in the second cylinder at crank angle C and occurs in the fourth cylinder at crank angle D in the engine shown in FIG. 28. That is, since the torque is generated in succession within a short time as described above, the driving energy rises in a portion of one cycle, so the driving energy per unit time becomes non-uniform as described above.

An occupant of a vehicle equipped with this four-cylinder engine sometimes experiences the rises of torque occurring in succession within a short time as one torque rise when the engine speed is low. The occupant often feels that the magnitude of this torque experienced as one torque rise is larger than that of torque which rises in each of the two other explosions. This is so because the torque rises twice within a short time, so the occupant feels that the torque rise time is long. That is, as indicated by the alternate long and two short dashed line in FIG. 28, the occupant feels that the torque is generated once although it is actually generated twice, and, in addition to that, misunderstands that the generated torque is larger than the torque generated when explosion occurs in another cylinder (the first or third cylinder).

Consequently, the occupant experiences an irregular torque change when the engine speed is low, and feels a sense of discomfort.

SUMMARY OF THE INVENTION

Preferred embodiments of the present invention eliminate the problems described above, and provide a four-cylinder engine which causes unequal-interval explosions but produces little or no change in the driving energy per unit time during an operating state in which an occupant tends to feel torque fluctuations, and a method of operating the four-cylinder engine.

According to a preferred embodiment of the present invention, a four-cylinder engine includes a cylinder body including four cylinder holes, a cylinder head attached to the cylinder body and including intake ports and exhaust ports for the respective cylinder holes, spark plugs attached to the cylinder head for the respective cylinder holes, an ignition device including the spark plugs, an intake device connected to the intake ports, an exhaust device connected to the exhaust ports, four pistons slidably fitted in the cylinder holes, and a crankshaft connected to the pistons by connecting rods, wherein explosion intervals of four cylinders defined by the four cylinder holes are 270°, 180°, 90°, and 180° as crank angles, and the four-cylinder engine further includes a discomfort eliminator which, when an engine speed is lower than a predetermined value, causes an indicated mean effective pressure of at least one of two cylinders having an explosion interval of 90° to be lower than indicated mean effective pressures of other cylinders having an explosion interval of not 90°.

A method of operating a four-cylinder engine according to a preferred embodiment of the present invention includes setting explosion intervals at 270°, 180°, 90°, and 180° as crank angles in a four-cylinder engine including a cylinder body including four cylinder holes, a cylinder head attached to the cylinder body and including intake ports and exhaust ports for the respective cylinder holes, spark plugs attached to the cylinder head for the respective cylinder holes, an ignition device including the spark plugs, an intake device connected to the intake ports, an exhaust device connected to the exhaust ports, four pistons slidably fitted in the cylinder holes, and a crankshaft connected to the pistons by connecting rods, and causing an indicated mean effective pressure of at least one of two cylinders having an explosion interval of 90° to be lower than indicated mean effective pressures of other cylinders having an explosion interval of not 90° when an engine speed is lower than a predetermined value.

In the four-cylinder engine and the method of operating the four-cylinder engine according to various preferred embodiments of the present invention, the output torque of the engine rises twice within a short time because explosions occur in two cylinders having an explosion interval of 90° as a crank angle. During an operating state in which an occupant tends to feel torque fluctuations of the engine, i.e., when the engine speed is lower than the predetermined value, the indicated mean effective pressure of at least one of the two cylinders having an explosion interval of 90° as a crank angle is made lower than the indicated mean effective pressures of other cylinders having an explosion interval of not 90°.

Consequently, the magnitude of torque generated in at least one of the two cylinders having an explosion interval of 90° as a crank angle becomes smaller than those of torques generated in the other two cylinders. This prevents or significantly reduces the phenomenon in which the driving energy becomes higher in a portion of one cycle than in other portions because torques are successively generated within a short time. Accordingly, preferred embodiments of the present invention provide a four-cylinder engine that uniformly provides the driving energy of the engine, and a method of operating the four-cylinder engine.

An occupant of a vehicle equipped with a four-cylinder engine in which explosion intervals are 270°, 180°, 90°, and 180° as described above is apt to misunderstand that torque has risen at once when torques have risen in succession within a short time which is 90° as a crank angle. In addition, the occupant feels that the torque rise time is relatively long in a situation like this, and hence often feels that the magnitude of the torque is large.

In the four-cylinder engine and the method of operating the four-cylinder engine according to various preferred embodiments of the present invention, however, when explosions occur in two cylinders having an explosion interval of 90° as a crank angle, it is possible to give an occupant the feeling that torque rises at once with the same magnitude as that when explosions occur in the other two cylinders.

As described above, the four-cylinder engine and the method of operating the four-cylinder engine enables an occupant to experience, e.g., the same vibrations and torque fluctuations as those of a three-cylinder engine in which explosion intervals are not so different. A three-cylinder engine in which explosions occur at equal intervals gives no sense of discomfort to an occupant of a vehicle equipped with this engine.

Accordingly, when applying the four-cylinder engine and the method of operating the four-cylinder engine according to various preferred embodiments of the present invention to an engine for a vehicle, an occupant hardly feels a sense of discomfort even during an operating state in which the occupant is liable to feel torque fluctuations of the engine.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 17 is a block diagram showing the configuration of a control system of the four-cylinder engine according to a third preferred embodiment of the present invention.

FIG. 18 is a map showing the throttle valve openings of second and fourth cylinders according to the third preferred embodiment of the present invention.

FIG. 19 is a flowchart for explaining the operation of a controller (a method of operating the four-cylinder engine) according to the third preferred embodiment of the present invention.

FIG. 20 is a plan view showing the first modification of the intake device according to the third preferred embodiment of the present invention.

DETAILED DESCRIPTION OF THE PREFERRED EMBODIMENTS

First Preferred Embodiment

A first preferred embodiment of a four-cylinder engine and a method of operating the four-cylinder engine will be explained in detail below with reference to FIGS. 1 to 9.

Figure 1:
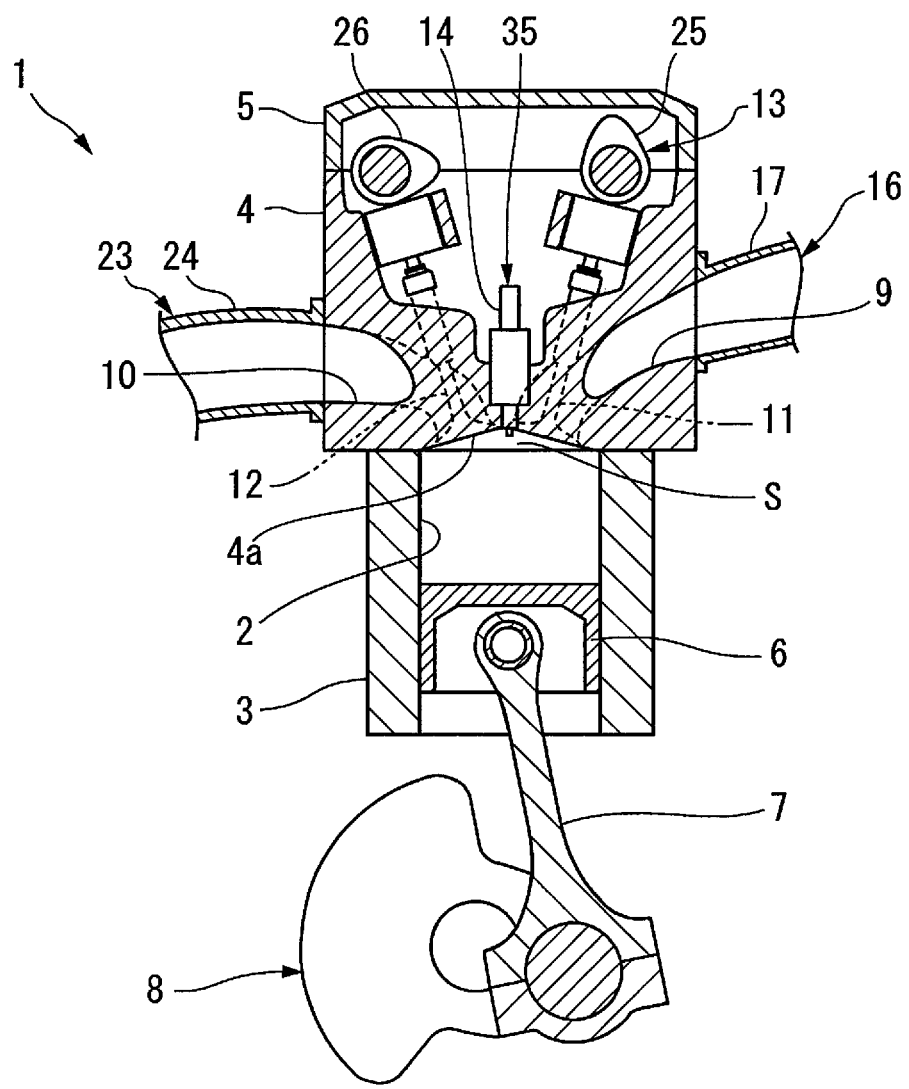
FIG. 1 is a sectional view showing the arrangement of a four-cylinder engine according to a first preferred embodiment of the present invention.

A four-cylinder engine 1 shown in FIG. 1 preferably is a 4-stroke inline four-cylinder engine or 4-stroke parallel four-cylinder engine to be mounted in a vehicle (not shown), for example. FIG. 1 depicts only the main constituent elements of the four-cylinder engine 1. As shown in FIG. 1, the four-cylinder engine 1 includes a cylinder body 3 including four cylinder holes 2, a cylinder head 4 attached to the cylinder body 3, and a head cover 5 attached to the cylinder head 4.

Figure 2:
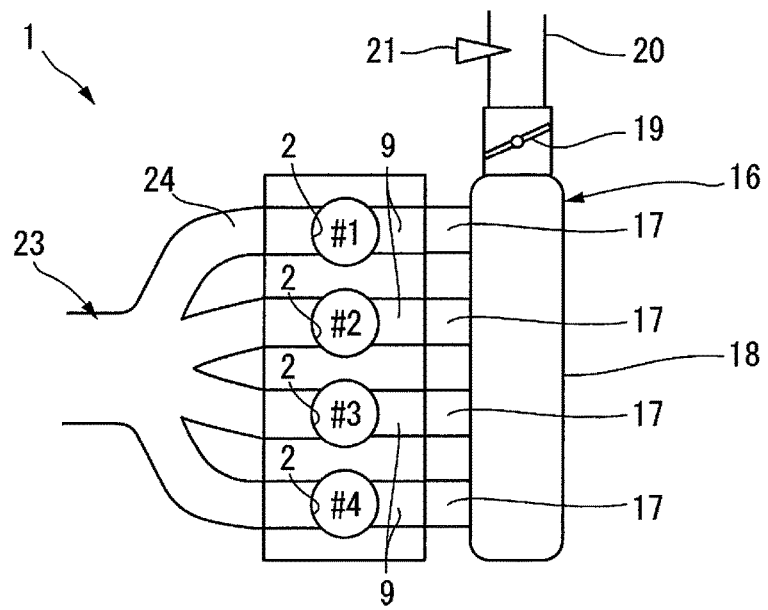
FIG. 2 is a plan view showing the arrangement of an intake device of the four-cylinder engine according to the first preferred embodiment of the present invention.

As shown in FIG. 2, the four cylinder holes 2 are provided in the cylinder body 3 to extend along a line in the radial direction. The four-cylinder engine includes first to fourth cylinders including the four cylinder holes 2. In FIG. 2, reference symbols #1, #2, #3, and #4 respectively denote the first, second, third, and fourth cylinders. Referring to FIG. 2, the first to fourth cylinders are arranged in this order as seen from above.

As shown in FIG. 1, pistons 6 are slidably fitted in the four cylinder holes 2. Each piston 6 is connected to a crankshaft 8 (to be described below) by a connecting rod 7.

A recess 4a as the ceiling wall of a combustion chamber S is provided in the cylinder head 4, which opposes each cylinder hole 2. Each recess 4a preferably has a circular shape when viewed from the cylinder hole 2.

The downstream-side end portion of an intake port 9 branches into two portions, and these two portions open in the recess 4a. In addition, the upstream-side end portion of an exhaust port 10 branches into two portions, and these two portions open in the recess 4a.

Figure 4:
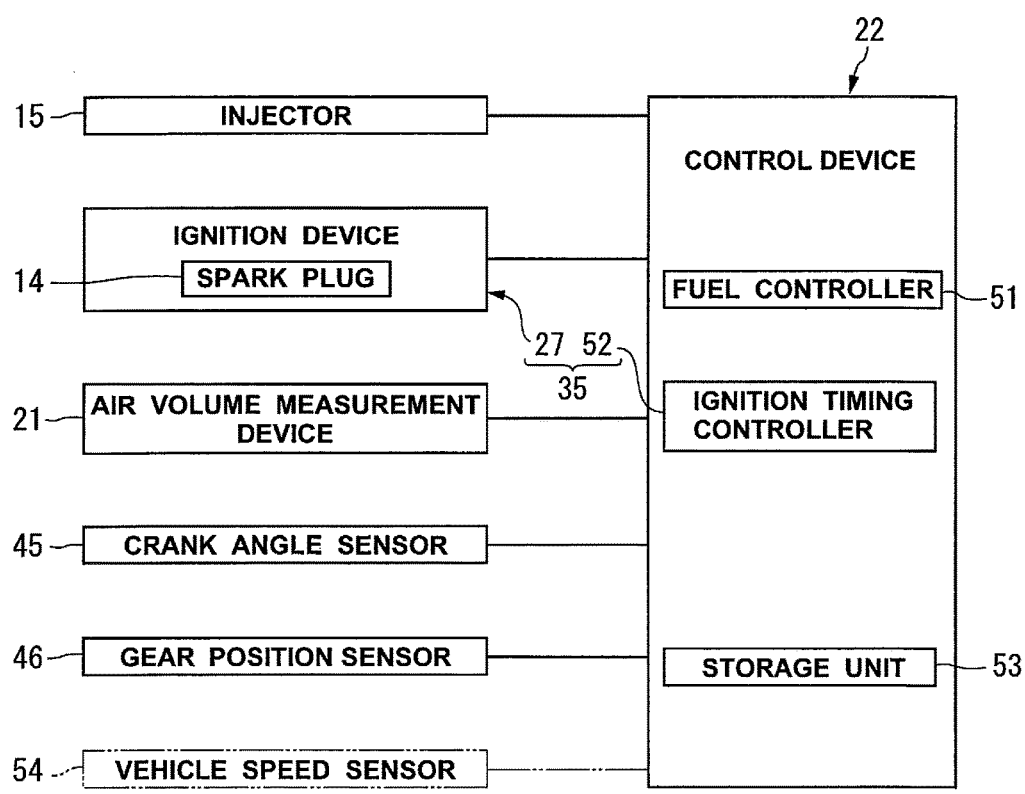
FIG. 4 is a block diagram of the configuration of a control system of the four-cylinder engine according to the first preferred embodiment of the present invention.

The cylinder head 4 includes two intake valves 11 to open/close the intake ports 9, two exhaust valves 12 to open/close the exhaust port 10, a valve driving device 13 to drive the intake valves 11 and exhaust valves 12, spark plugs 14, and a fuel injector 15 (see FIG. 4). As the fuel injector 15, it is possible to use a device which injects fuel into the intake port 9, into an intake pipe 17 on the upstream side of the intake port 9, or into the recess 4a.

As shown in FIG. 2, the upstream-side end portions of the intake ports 9 are opened in one side portion of the cylinder head 4, and connected to an intake device 16. The intake device 16 includes a surge tank 18 connected to all the intake ports 9 by the intake pipes 17. The surge tank 18 includes a throttle valve 19 in one end portion in the direction in which the cylinder holes 2 are arranged, and is connected to an air cleaner (not shown) via the throttle valve 19. An occupant remotely operates the throttle valve 19.

An intake duct 20 that connects the air cleaner to the throttle valve 19 includes an air volume measurement device 21 that measures the flow rate of air flowing through the intake duct 20. The air volume measurement device 21 may include, e.g., an air flow meter. The air volume measurement device 21 is connected to a controller 22 (to be described below), and supplies detection data that specifies the intake air volume to the controller 22.

As shown in FIG. 1, the downstream-side end portions of the exhaust ports 10 are opened in the other side portion of the cylinder head 4. Exhaust pipes 24 of an exhaust device 23 are connected to the downstream-side end portions of all the exhaust ports 10.

The valve driving device 13 is preferably a DOHC valve driving device including an intake cam shaft 25 and an exhaust cam shaft 26. The intake cam shaft 25 and the exhaust cam shaft 26 are connected to the crankshaft 8 via a winding power transmission (not shown). Note that the valve drive of the valve driving device 13 is not limited to a DOHC, and may also be another valve drive such as a SOHC.

The spark plugs 14 are provided for the respective cylinder holes 2, and attached to the central portion of the recess 4a of the cylinder head 4. The spark plugs 14 define an ignition device 27 (see FIG. 4) of the four-cylinder engine 1 together with the controller 22 (to be described below).

Figure 3:
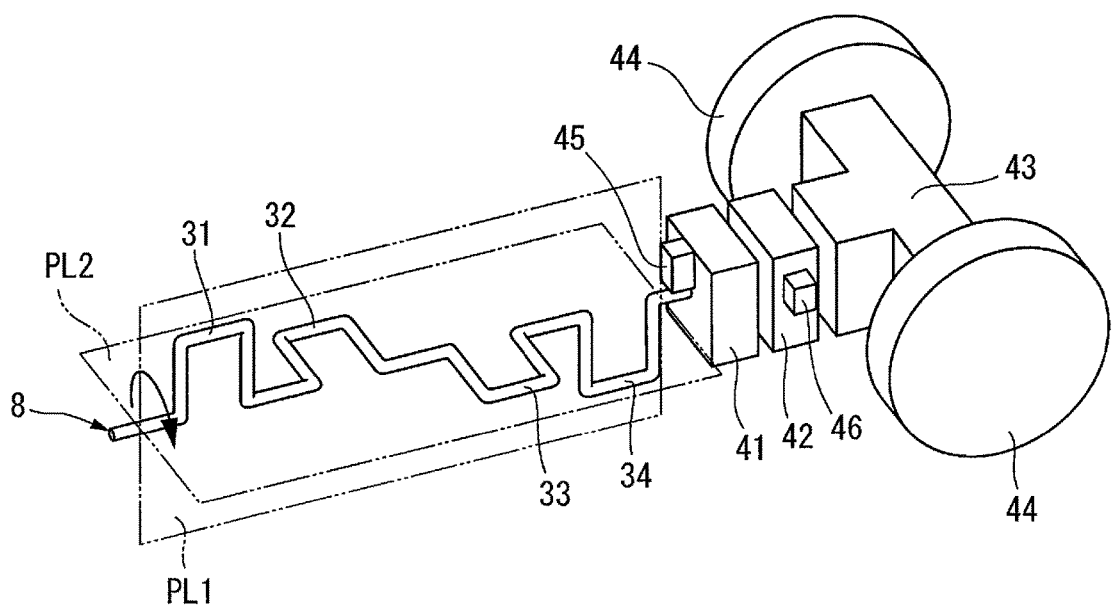
FIG. 3 is a perspective view showing the arrangement of a crankshaft and powertrain according to the first preferred embodiment of the present invention.

As shown in FIG. 3, the crankshaft 8 is a so-called, two-plane-type crankshaft, and includes crank pins 31 to 34 in one-to-one correspondence with the cylinders. The first-cylinder crank pin 31 and fourth-cylinder crank pin 34 of the crankshaft 8 according to the present preferred embodiment are positioned on a first virtual plane PL1. The first-cylinder crank pin 31 is connected to the first-cylinder piston 6 by the connecting rod 7. The fourth-cylinder crank pin 34 is connected to the fourth-cylinder piston 6 by the connecting rod 7. The second-cylinder crank pin 32 and third-cylinder crank pin 33 of the crankshaft 8 are positioned on a second virtual plane PL2 perpendicular or substantially perpendicular to the first virtual plane PL1. The second-cylinder crank pin 32 is connected to the second-cylinder piston 6 by the connecting rod 7. The third-cylinder crank pin 33 is connected to the third-cylinder piston 6 by the connecting rod 7.

Figure 5:
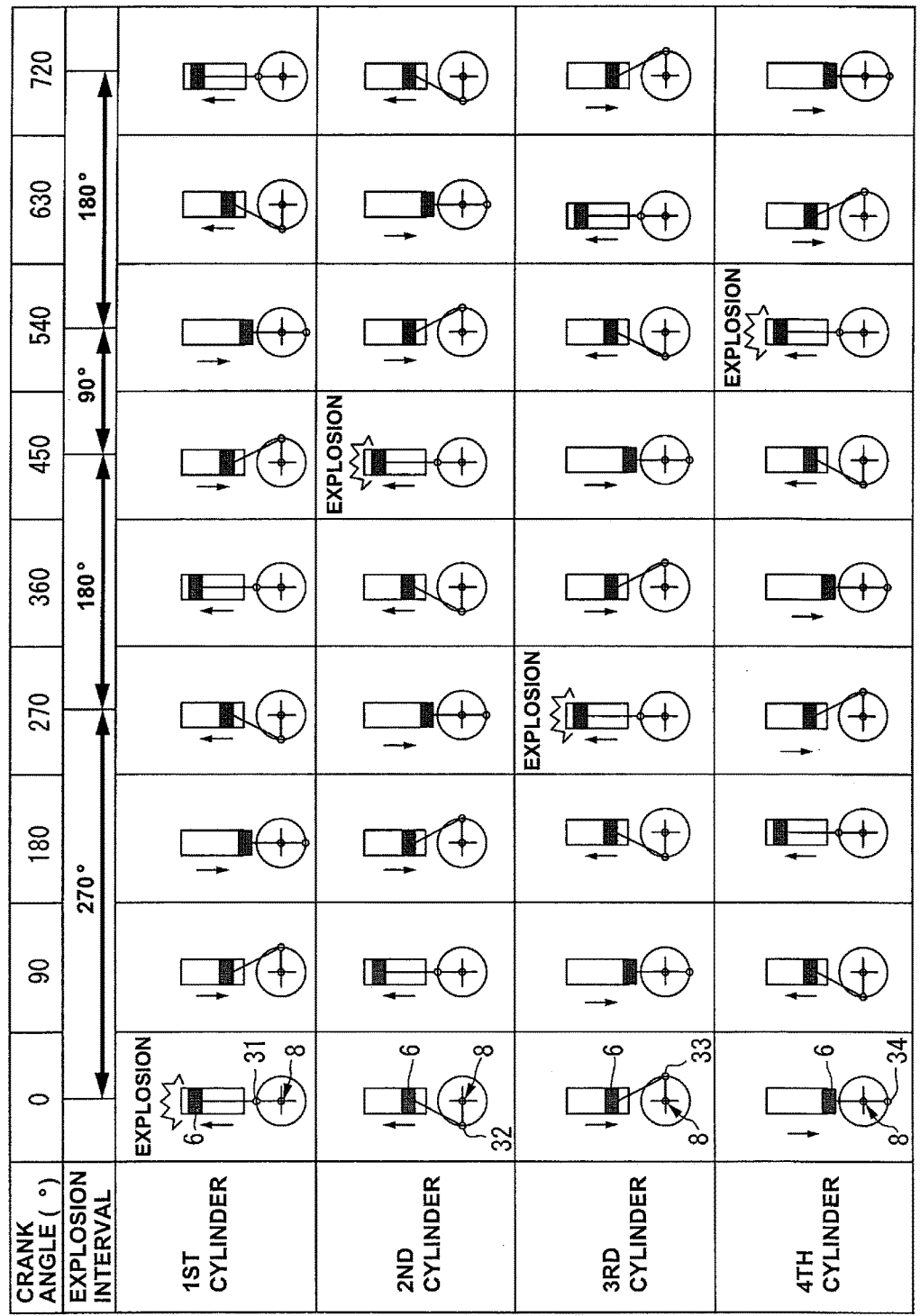
FIG. 5 is a view showing changes in positions of a piston and crank pin of each cylinder according to the first preferred embodiment of the present invention.

The crank pins 31 to 34 of the crankshaft 8 move as shown in FIG. 5 when the crankshaft 8 rotates in a direction indicated by the arrow in FIG. 3, i.e., rotates clockwise in the direction from the first cylinder to the fourth cylinder. FIG. 5 is a view showing the positions of the pistons 6 and crank pins 31 to 34 of the individual cylinders when the crankshaft 8 is rotated 90° at one time. As shown in FIG. 5, the ignition order of the four-cylinder engine 1 when using the crankshaft 8 is the first cylinder, third cylinder, second cylinder, and fourth cylinder.

The explosion interval between an explosion occurring in the first cylinder and an explosion occurring in the third cylinder is 270° as a crank angle. The explosion interval between an explosion occurring in the third cylinder and an explosion occurring in the second cylinder is 180° as a crank angle. The explosion interval between an explosion occurring in the second cylinder and an explosion occurring in the fourth cylinder is 90° as a crank angle. The explosion interval between an explosion occurring in the fourth cylinder and an explosion occurring in the first cylinder is 180° as a crank angle.

That is, the explosion intervals of the four-cylinder engine 1 are 270°, 180°, 90°, and 180° as crank angles. The four-cylinder engine 1 including explosion intervals like these may give a sense of discomfort to an occupant as described previously. However, the four-cylinder engine 1 according to the present preferred embodiment hardly gives a sense of discomfort to an occupant due to the action of a discomfort eliminator 35 to be described below (see FIG. 1). The discomfort eliminator 35 preferably has a structure in which, when the operating state of the engine is a predetermined state, the indicated mean effective pressure of at least one of the second and fourth cylinders having an explosion interval of 90° is made to be lower than the indicated mean effective pressures of the first and third cylinders having an explosion interval of not 90°. The indicated mean effective pressure is obtained by dividing the work directly provided to the piston 6 by a combustion gas by the stroke volume. As will be described in detail below, the discomfort eliminator 35 according to the present preferred embodiment causes the indicated mean effective pressure to decrease when the ignition timing is delayed.

As shown in FIG. 3, driving wheels 44 are connected to the crankshaft 8 via a clutch 41, a transmission 42, and a power transmitting mechanism 43. FIG. 3 depicts the power transmitting mechanism 43 so that the axis of the driving wheels 44 is perpendicular or substantially perpendicular to the axis of the crankshaft 8. However, the present invention is not limited to this. That is, the power transmitting mechanism 43 may also be arranged such that the axis of the driving wheels 44 is parallel or substantially parallel to the axis of the crankshaft 8.

A crank angle sensor 45 that senses the engine speed based on the rotational angle of the crankshaft 8 is arranged near the clutch 41 shown in FIG. 3. The crank angle sensor 45 supplies sensing data that specifies the rotational angle of the crankshaft 8 to the controller 22.

The transmission 42 shown in FIG. 3 includes a gear position sensor 46 that senses the gear position. The gear position sensor 46 supplies sensing data that specifies the gear stage of the transmission 42 to the controller 22. The gear stage is a numerical value that specifies the speed ratio of the transmission 42, and hence may be used to obtain the vehicle speed by an arithmetic operation in association with the engine speed.

As shown in FIG. 4, the controller 22 includes a fuel controller 51, an ignition timing controller 52, and a storage 53.

The fuel controller 51 controls the fuel injection amount and fuel injection timing of the fuel injector 15.

The ignition timing controller 52 sets the ignition timing of each of the first to fourth cylinders based on a predetermined procedure, and supplies an ignition signal to the ignition device 27 when this ignition timing is reached. In the present preferred embodiment, the ignition timing controller 52 and ignition device 27 define the above-described discomfort eliminator 35.

The ignition timing controller 52 sets the ignition timing so as to reduce a sense of discomfort provided to an occupant due to unequal-interval explosions during an operating state in which the occupant is liable to feel torque fluctuations. In the present preferred embodiment, when the engine speed is lower than a predetermined value and the load is in a predetermined region, the sense of discomfort is reduced by making the indicated mean effective pressures of the second and fourth cylinders lower than those of the two other cylinders (the first and third cylinders having an explosion interval of not 90°). The present preferred embodiment preferably uses a method of retarding the ignition timing as a method of lowering the indicated mean effective pressure. That is, as will be described in detail below, the four-cylinder engine 1 according to the present preferred embodiment delays the ignition timings of the second and fourth cylinders by a predetermined amount from those of the two other cylinders during an operating state in which an occupant tends to feel torque fluctuations. Control by which the ignition timing controller 52 thus delays the ignition timings of the second and fourth cylinders from those of the other cylinders will simply be called "retard control" hereinafter.

Figure 6:
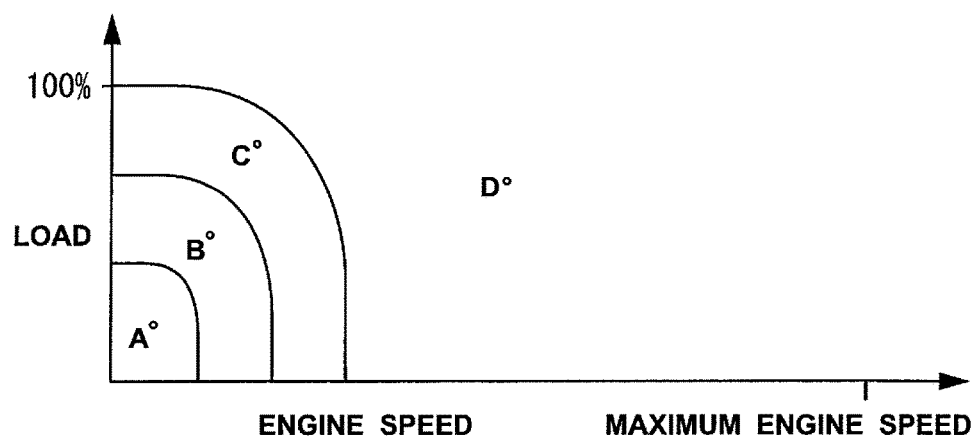
FIG. 6 is a view showing an ignition timing map for first and third cylinders according to the first preferred embodiment of the present invention.
Figure 7:
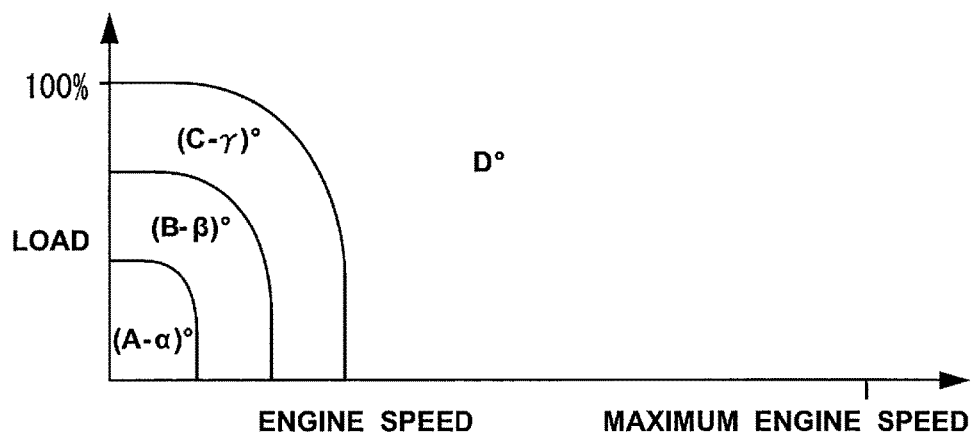
FIG. 7 is a view showing an ignition timing map for second and fourth cylinders according to the first preferred embodiment of the present invention.

The ignition timings of the first to fourth cylinders are preferably set by using, e.g., maps as shown in FIGS. 6 and 7. FIGS. 6 and 7 show maps in which the ignition timings are allocated to the engine speed and load. FIG. 6 is an ignition timing map showing the ignition timings of the first and third cylinders. FIG. 7 is an ignition timing map showing the ignition timings of the second and fourth cylinders. These maps are stored in the storage 53 of the controller 22.

When performing retard control, a retard amount is set such that the decrease in the indicated mean effective pressure caused by retarding the timing increases in accordance with the operating state of the engine. The operating state of the engine is specified by using the engine speed and load. That is, the retard amount is set such that the decrease in the indicated mean effective pressure increases as the engine speed decreases and the load increases.

When the ignition timings of the first and third cylinders are at $A°$ before top-dead-center (BTDC), the ignition timings of the second and fourth cylinders shown in FIG. 7 are at $(A-\alpha)°$, i.e., delayed by $\alpha°$. Also, when the ignition timings of the first and third cylinders are at $B°$, the ignition timings of the second and fourth cylinders are at $(B-\beta)°$, i.e., delayed by $\beta°$ from the ignition timings of the first and third cylinders. When the ignition timings of the first and third cylinders are at $C°$, the ignition timings of the second and fourth cylinders are at $(C-\gamma)°$, i.e., delayed by $\gamma°$ from the ignition timings of the first and third cylinders. When the ignition timings of the first and third cylinders are at $D°$, i.e., when the engine speed and load are high, the ignition timings of the second and fourth cylinders are also at $D°$. Note that the order of the absolute values of $\alpha$, $\beta$, and $\gamma$ is not necessarily this order.

The maps shown in FIGS. 6 and 7 are provided for each gear stage of the transmission. A map to be used when the gear stage is, e.g., the first gear matches an operating state when the vehicle speed is low such as when the vehicle starts. That is, the first-gear map causes the retard amount to be smaller than that of the second-gear map for the same vehicle speed. More specifically, the maps are such that the retard amount increases as the gear stage becomes higher for the same vehicle speed.

Figure 8:
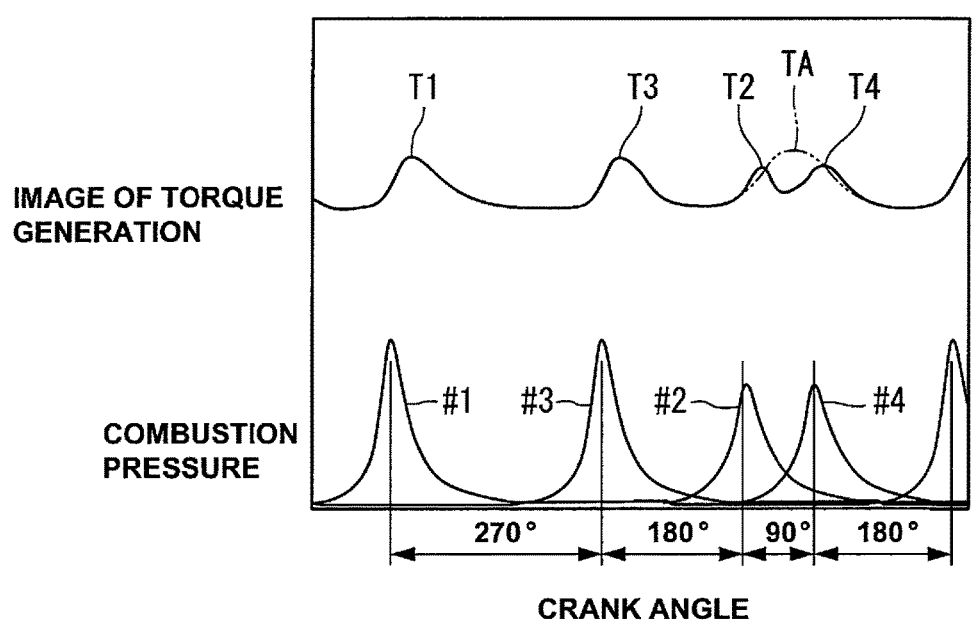
FIG. 8 is a graph showing changes in combustion pressure and generated torque with respect to a crank angle according to the first preferred embodiment of the present invention.
Figure 9:
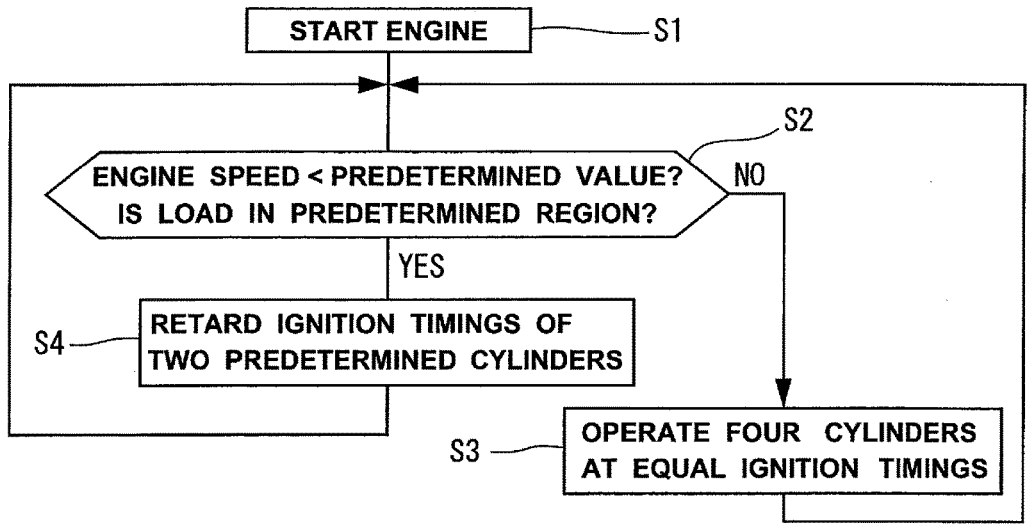
FIG. 9 is a flowchart for explaining the operation of a controller (a method of operating the four-cylinder engine) according to the first preferred embodiment of the present invention.

If the ignition timing lags behind a normal timing, the indicated mean effective pressure during combustion decreases. Therefore, a retard amount corresponding to the operating state of the engine is read out from the above-described maps, and the ignition timings of the second and fourth cylinders are delayed by this retard amount from those of the two other cylinders. As a consequence, the indicated mean effective pressures of the second and fourth cylinders become lower than those of the two other cylinders. That is, as shown in FIG. 8, the combustion pressures of the second and fourth cylinders become lower than those of the first and third cylinders. As the combustion pressures decrease, torques T2 and T4 generated when explosions occur in the second and fourth cylinders become smaller than torques T1 and T3 of the other cylinders. An occupant sometimes misunderstands that torque is generated only once although the torques T2 and T4 are generated in succession. That is, as indicated by the alternate long and two short dashed line in FIG. 8, an occupant sometimes feels that a synthetic torque TA is generated only once.

As described previously, the magnitude of the torque T2 generated when explosion occurs in the second cylinder and the magnitude of the torque T4 generated when explosion occurs in the fourth cylinder are smaller than the magnitudes of the torques T1 and T3 generated when explosions occur in the two other cylinders. Accordingly, an occupant often feels that the magnitude of the synthetic torque TA is not largely different from the magnitudes of the torques T1 and T3 generated when explosions occur in the other cylinders.

Next, a method of operating the four-cylinder engine according to the present preferred embodiment will be explained. The controller 22 configured and programmed as described above operates as shown in a flowchart of FIG. 9. That is, after starting the four-cylinder engine 1 in step S1 of the flowchart shown in FIG. 9, the controller 22 advances the process to step S2, and determines whether the engine speed is lower than a predetermined value, and whether the load is in a predetermined region. The predetermined value and predetermined region herein mentioned are a value and region corresponding to an operating state in which an occupant tends to feel torque fluctuations of the engine, i.e., a value and region requiring retard control. More specifically, in step S2, the controller 22 first reads out ignition timing maps (FIGS. 6 and 7) corresponding to the present gear stage from the storage 53. Then, the controller 22 applies the present engine speed and engine load to the ignition timing maps, and reads out the ignition timing of each cylinder from each map.

If the speed and load of the four-cylinder engine 1 are in a region indicated by reference symbol D in the maps shown in FIGS. 6 and 7, i.e., if no retard control is necessary, the process advances from step S2 to step S3, and the ignition timings are so controlled that the ignition timings of the first to fourth cylinders before top-dead-center (BTDC) match without performing any retard control.

On the other hand, if the engine speed and load are in regions indicated by reference symbols A to C in the map shown in FIG. 6, the process advances from step S2 to step S4, and retard control is performed. In this step, the ignition timings of the first and third cylinders are set at the ignition timings read out from the ignition timing map shown in FIG. 6. The ignition timings of the second and fourth cylinders are set at the ignition timings read out from the ignition timing map shown in FIG. 7, i.e., set at ignition timings delayed from those of the first and third cylinders. While the engine is in operation, the controller 22 controls the ignition timings by repetitively performing the above-mentioned control.

In the four-cylinder engine 1 described above, during an operating state in which the engine speed is lower than the predetermined value, the load is in the predetermined region, and an occupant is apt to feel torque fluctuations of the engine, the ignition timings of two cylinders (the second and fourth cylinders) having an explosion interval of 90° as a crank angle are retarded by a predetermined retard amount from the ignition timings of the other cylinders. Therefore, the indicated mean effective pressures of the two cylinders having an explosion interval of 90° as a crank angle become lower than those of the two other cylinders. Consequently, the magnitudes of the torques T2 and T4 which rise because explosions occur in the second and fourth cylinders become smaller than those of the torques T1 and T3 which rise because explosions occur in the first and third cylinders.

In addition, when the torques T2 and T4 smaller than the torques T1 and T3 are successively generated within a short time, an occupant is liable to misunderstand that the torque rises at once with the same magnitude as those when explosions occur in other cylinders (the first and third cylinders).

That is, in the four-cylinder engine 1 and the method of operating the four-cylinder engine according to the present preferred embodiment, when explosions occur in two cylinders (the second and fourth cylinders) having an explosion interval of 90° as a crank angle, it is possible to give an occupant the feeling that the torque rises at once with the same magnitude as those when explosions occur in the two other cylinders (the first and third cylinders). Therefore, the four-cylinder engine 1 enables an occupant to experience, e.g., the same vibrations and torque fluctuations as those of a three-cylinder engine including explosion intervals which are not so different. A three-cylinder engine in which explosions occur at equal intervals give no sense of discomfort to an occupant.

Accordingly, the present preferred embodiment provides a four-cylinder engine which hardly gives an occupant a sense of discomfort, in other words, a four-cylinder engine in which the driving energy is uniform, even during an operating state in which the occupant is apt to feel torque fluctuations of the engine, and a method of operating the four-cylinder engine. When a preferred embodiment of the present invention was applied to a four-cylinder engine of an automobile and the present inventor drove the automobile, there was no sense of discomfort which made the present inventor aware of unequal-interval explosions.

It is known that the fuel efficiency of an engine decreases as the ignition timing is delayed.

In the present preferred embodiment, the retard amount of the ignition timing is so set that the indicated mean effective pressure decreases in accordance with the operating state of the engine. This makes it possible to set a minimum necessary retard amount. Accordingly, the present preferred embodiment provides a four-cylinder engine that eliminates a sense of discomfort of an occupant and increases the fuel efficiency at the same time, and a method of operating the four-cylinder engine.

In the present preferred embodiment, the indicated mean effective pressures of the second and fourth cylinders having an explosion interval of 90° are decreased by retarding the ignition timings from those of the first and third cylinders having an explosion interval of not 90°. The ignition timing of the engine is easily changed electronically by the controller 22.

Accordingly, the four-cylinder engine 1 according to the present preferred embodiment is able to use an existing four-cylinder engine while preventing an increase in the cost.

In the present preferred embodiment, the ignition timings of the second and fourth cylinders are the same. However, the present invention is not limited to this. That is, the ignition timings of the second and fourth cylinders may also be different from each other. It is also possible to use an arrangement in which the ignition timing of one of the second and fourth cylinders matches the ignition timings of the first and third cylinders, and the ignition timing of the other is delayed.

More specifically, when a preferred embodiment of the present invention is applied to the four-cylinder engine 1 in which the ignition timings of the second and fourth cylinders are different, the discomfort eliminator 35 delays the ignition timing of at least one of the two cylinders (the second and fourth cylinders) having an explosion interval of 90° from the ignition timings of the other cylinders (the first and third cylinders) having an explosion interval of not 90°.

Ignition timing control like this may be implemented by, e.g., using a second cylinder ignition timing map, and a fourth cylinder ignition timing map which is separate from the second cylinder ignition timing map.

The use of an arrangement like this makes it possible to individually control the magnitude of torque to be generated when an explosion occurs in the second cylinder, and the magnitude of torque to be generated when an explosion occurs in the fourth cylinder. By using this arrangement, therefore, the engine driving energy is easily made to be uniform.

In the first preferred embodiment, the conditions of making the indicated mean effective pressures of two cylinders having an explosion interval of 90° lower than the indicated mean effective pressures of the two other cylinders are that the engine speed is smaller than the predetermined value and the load is in the predetermined region. However, the present invention is not limited to this, and the vehicle speed may be added to the conditions. In this case, as explained in above, the vehicle speed may be obtained by an arithmetic operation from the engine speed sensed by the crank angle sensor 45 and the gear stage sensed by the gear position sensor 46. As shown in FIG. 4, it is also possible to connect a vehicle speed sensor 54 to the controller 22, and obtain the vehicle speed by using the vehicle speed sensor 54.

Second Preferred Embodiment

As shown in FIGS. 10 to 13, the indicated mean effective pressures of two cylinders having an explosion interval of 90° may also be decreased by using an intake device. The same reference numerals as in FIGS. 1 to 9 denote the same or similar members in FIGS. 10 to 13, and a detailed explanation thereof will properly be omitted.

Figure 10:
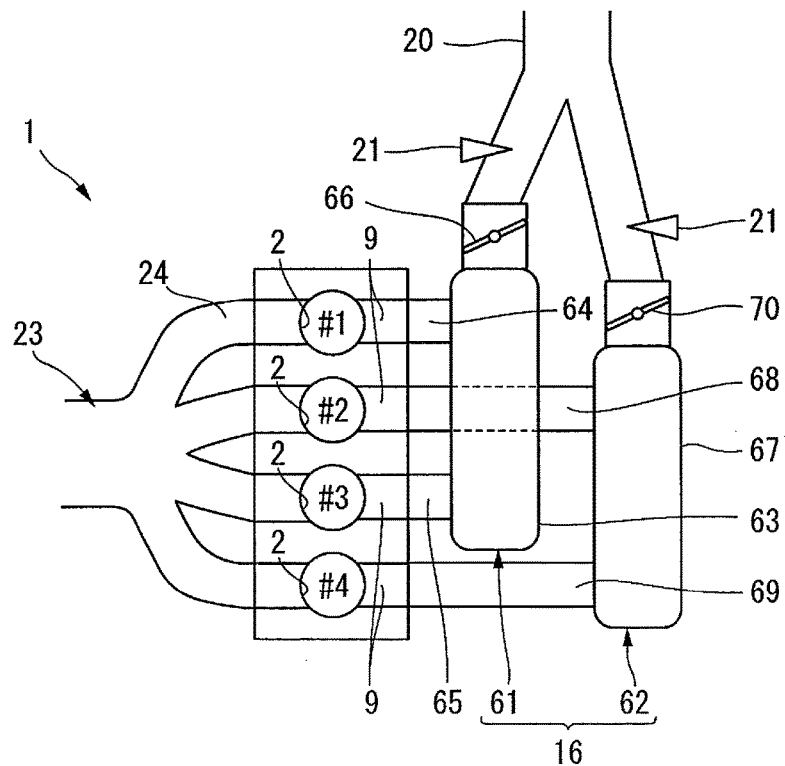
FIG. 10 is a plan view showing the arrangement of an intake device of a four-cylinder engine according to a second preferred embodiment of the present invention.

The differences of a four-cylinder engine 1 shown in FIG. 10 from the four-cylinder engine when using the first preferred embodiment shown in FIGS. 1 to 9 are the configuration of an ignition system and an intake device 16, and the rest of the arrangements are the same. As will be described below, the ignition system of the four-cylinder engine 1 according to the present preferred embodiment improves or optimizes the ignition timings of all cylinders by producing differences between the intake air volumes of the cylinders. The present preferred embodiment does not perform retard control as explained in the above-described first preferred embodiment. The intake device 16 according to the present preferred embodiment includes a first intake device 61 and a second intake device 62.

The first intake device 61 includes a first surge tank 63. The first surge tank 63 is connected to an intake port 9 of a first cylinder by a first intake pipe 64, and is connected to an intake port 9 of a third cylinder by a third intake pipe 65. That is, the first surge tank 63 is connected to only the first and third cylinders. A first motor-operated throttle valve 66 is provided in one end portion of the first surge tank 63. An air volume measurement device 21 is installed on the intake upstream side of the first throttle valve 66.

The second intake device 62 includes a second surge tank 67 adjacent to the first surge tank 63. The second surge tank 67 is connected to an intake port 9 of a second cylinder by a second intake pipe 68, and connected to an intake port 9 of a fourth cylinder by a fourth intake pipe 69. That is, the second surge tank 67 is connected to only the second and fourth cylinders. A second motor-operated throttle valve 70 is provided in one end portion of the second surge tank 67. An air volume measurement device 21 is installed on the intake upstream side of the second throttle valve 70. A throttle valve controller 71 of a controller 22 shown in FIG. 11 controls the operations of the first throttle valve 66 and second throttle valve 70.

The throttle valve controller 71 controls the openings of the first throttle valve 66 and second throttle valve 70 based on the operation amount of an accelerator operator 72 (see FIG. 11) to be operated by an occupant. The opening of the first throttle valve 66 increases or decreases in proportion to the operation amount of the accelerator operator 72. The opening of the second throttle valve 70 is set to be smaller than that of the first throttle valve 66 during an operating state in which an occupant is liable to feel torque fluctuations of the engine, and matched with that of the first throttle valve 66 in other operating states.

Figure 12:
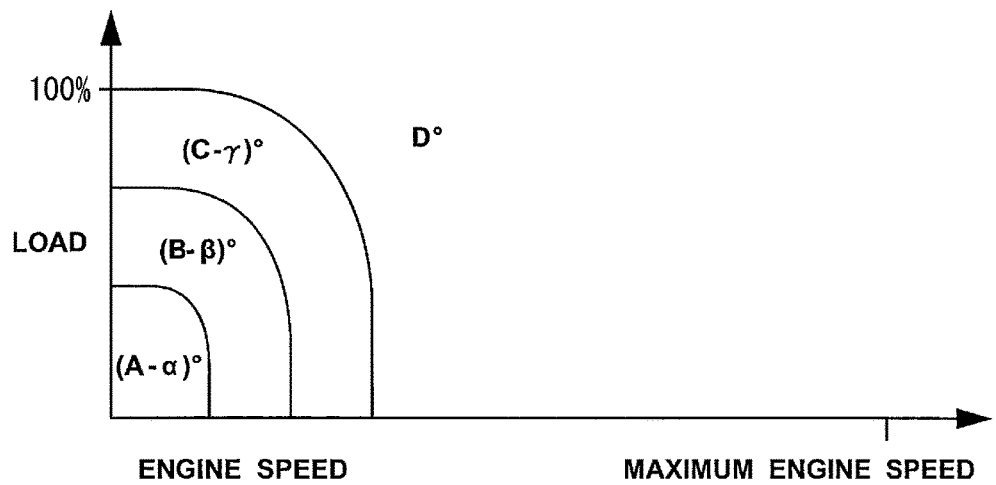
FIG. 12 is a map showing the throttle valve openings of second and fourth cylinders according to the second preferred embodiment of the present invention.
Figure 13:
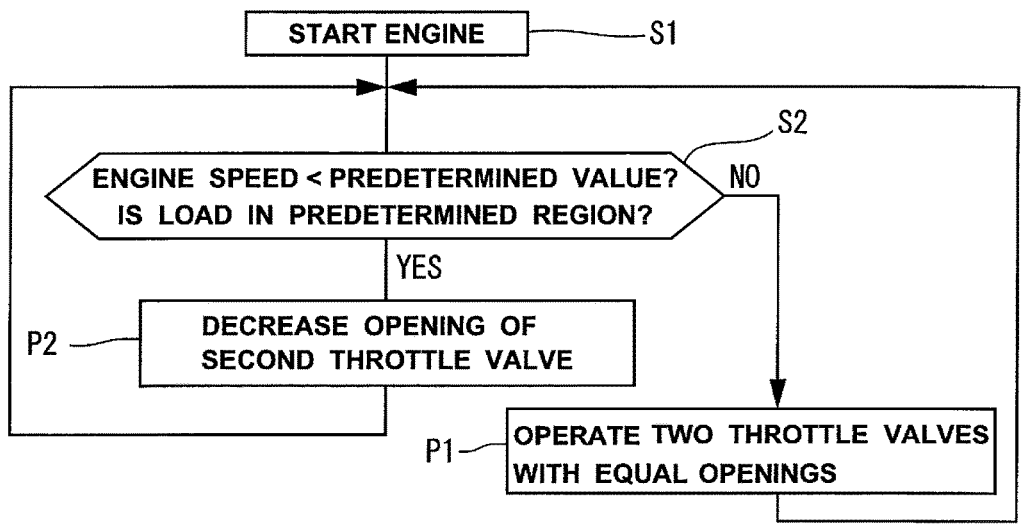
FIG. 13 is a flowchart for explaining the operation of a controller (a method of operating the four-cylinder engine) according to the second preferred embodiment of the present invention.

The throttle valve controller 71 according to the present preferred embodiment controls the opening of the second throttle valve 70 by using a map shown in FIG. 12.

In this map shown in FIG. 12, openings ((A−α)°, (B−β)°, and (C−γ)°) which decrease the opening of the second throttle valve 70 by α°, β°, and γ° with respect to the openings (A°, B°, C°, and D°) of the first throttle valve 66 are allocated to the engine speed and load. This map is provided for each gear stage of a transmission 42, and stored in a storage 53 of the controller 22.

When the opening of the second throttle valve 70 decreases, the intake air volumes of the second and fourth cylinders decrease, and the indicated mean effective pressures of these cylinders during combustion decrease. A discomfort eliminator 35 according to the present preferred embodiment causes the indicated mean effective pressure to decrease as the intake air volume reduces, and includes the throttle valve controller 71 and second throttle valve 70.

Next, a method of operating the four-cylinder engine according to the present preferred embodiment will be explained. The controller 22 according to the present preferred embodiment operates as shown in a flowchart of FIG. 13. That is, the controller 22 starts the engine in step S1 of the flowchart shown in FIG. 13, advances the process to step S2, and determines whether the engine speed is lower than a predetermined value, and whether the load is in a predetermined region. The predetermined value and predetermined region herein mentioned are a value and region corresponding to an operating state in which an occupant is apt to feel torque fluctuations of the engine, i.e., a value and region requiring control of decreasing the intake air volume. More specifically, in step S2, the controller 22 first reads out the map (FIG. 12) corresponding to the present gear stage from the storage 53. Then, the controller 22 applies the present engine speed and engine load to this map, and reads out an opening which decreases the opening of the second throttle valve 70 from the map.

If the engine speed and load are in a region indicated by reference symbol D in the map shown in FIG. 12, the process advances from step S2 to step P1, and the first throttle valve 66 and second throttle valve 70 are driven such that the openings of the two throttle valves 66 and 70 match.

On the other hand, if the engine speed and load are in regions indicated by reference symbols A to C in the map shown in FIG. 12, the process advances from step S2 to step P2, and the opening of the second throttle valve 70 is decreased. In this step, the opening of the second throttle valve 70 is set at the openings ((A−α)°, (B−β)°, and (C−γ)°) read out from the map shown in FIG. 12 and smaller than the openings (A°, B°, C°, and D°) of the first throttle valve 66 by α°, β°, and γ°. While the engine is in operation, the controller 22 controls the openings of the first throttle valve 66 and the second throttle valve 70 by repetitively performing the above control.

In the four-cylinder engine 1 and the method of operating the four-cylinder engine according to the present preferred embodiment, during an operating state in which the engine speed is lower than the predetermined value, the load is in the predetermined region, and an occupant is apt to feel torque fluctuations of the engine, the intake air volumes of two cylinders (the second and fourth cylinders) having an explosion interval of 90° as a crank angle reduce, and the indicated mean effective pressures of these two cylinders are made lower than those of the two other cylinders. Even when using the present preferred embodiment, therefore, the same effect as that when using the first preferred embodiment is obtained.

In the present preferred embodiment, the second intake device 62 connected to the second and fourth cylinders having an explosion interval of 90° includes one surge tank (the surge tank 67) connected to the intake ports 9 of the two cylinders, and one throttle valve (the second throttle valve 70) in the surge tank. The discomfort eliminator 35 according to the present preferred embodiment controls the opening of the second throttle valve 70 to make the intake air volumes of the two cylinders including an explosion internal of 90° smaller than the intake air volumes of the other cylinders having an explosion interval of not 90°. In the present preferred embodiment, the indicated mean effective pressures of the second and fourth cylinders are decreased by controlling the opening of the second throttle valve 70, such that the intake air volumes become smaller than those of the first and third cylinders having an explosion interval of not 90°.

Accordingly, one throttle valve (the second throttle valve 70) controls the intake air volumes of the second and fourth cylinders having an explosion interval of 90°. That is, the indicated mean effective pressures of the second and fourth cylinders are almost equal. In addition, the indicated mean effective pressures of these cylinders are lower than those of the first and third cylinders.

This makes it possible to evenly control the indicated mean effective pressures of the second and fourth cylinders having an explosion interval of 90°. This eliminates variations in magnitudes of torques which rise when explosions occur in these two cylinders. As a consequence, the present preferred embodiment provides a four-cylinder engine which enables easy control of the indicated mean effective pressure, and a method of operating the four-cylinder engine.

Modifications of the Second Preferred Embodiment

Figure 14:
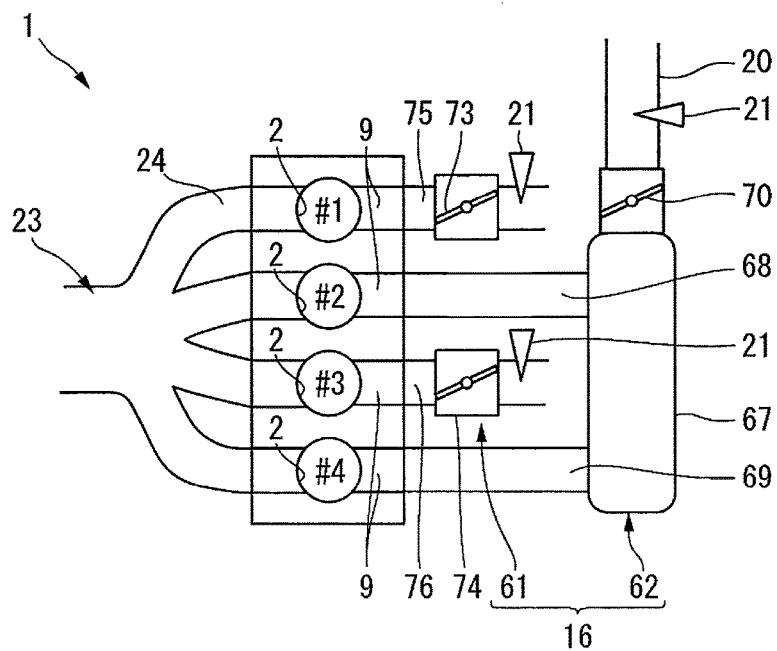
FIG. 14 is a plan view showing the first modification of the intake device according to the second preferred embodiment of the present invention.
Figure 15:
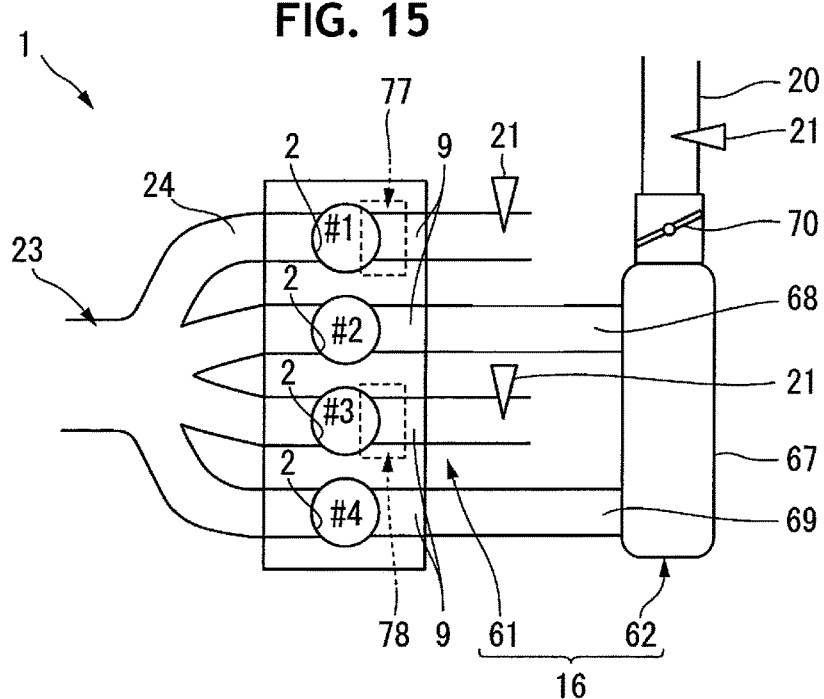
FIG. 15 is a plan view showing the second modification of the intake device according to the second preferred embodiment of the present invention.

When using the arrangement in which air is supplied to the second and fourth cylinders from one surge tank (the second surge tank 67), the intake device 61 is preferably as shown in FIG. 14 (the first modification) and FIG. 15 (the second modification). The same reference numerals as in FIGS. 1 to 13 denote the same or similar members in FIGS. 14 and 15, and a detailed explanation thereof will properly be omitted.

A first intake device 61 shown in FIG. 14 is the first modification, and includes a first-cylinder throttle valve 73 and a third-cylinder throttle valve 74. As the throttle valves 73 and 74, it is possible to use a motor-operated valve, or a valve connected to an accelerator operator 72 by an operation wire (not shown). The first-cylinder throttle valve 73 is connected to a first-cylinder intake port 9 by an intake pipe 75. The third-cylinder throttle valve 74 is connected to a third-cylinder intake port 9 by an intake pipe 76. The first-cylinder throttle valve 73 and third-cylinder throttle valve 74 operate in synchronism with each other so that their openings are the same. Also, the openings of the first-cylinder throttle valve 73 and third-cylinder throttle valve 74 increase or decrease in proportion to the operation amount of the accelerator operator 72.

A first intake device 61 shown in FIG. 15 is the second modification, and includes a first variable valve mechanism 77 provided for the first cylinder, and a second variable valve mechanism 78 provided for the third cylinder. Each of the first variable valve mechanism 77 and second variable valve mechanism 78 is able to continuously change the opening/closing timings and lift amount of an intake valve 11. That is, the intake air volume of the first cylinder is controlled by changing the opening of a first-cylinder intake valve 11 by the first variable valve mechanism 77. The intake air volume of the third cylinder is controlled by changing the opening of a third-cylinder intake valve 11 by the second variable valve mechanism 78.

Even when the first intake device 61 is as shown in FIGS. 14 and 15, the same effect as that when using the second preferred embodiment is obtained.

Figure 11:
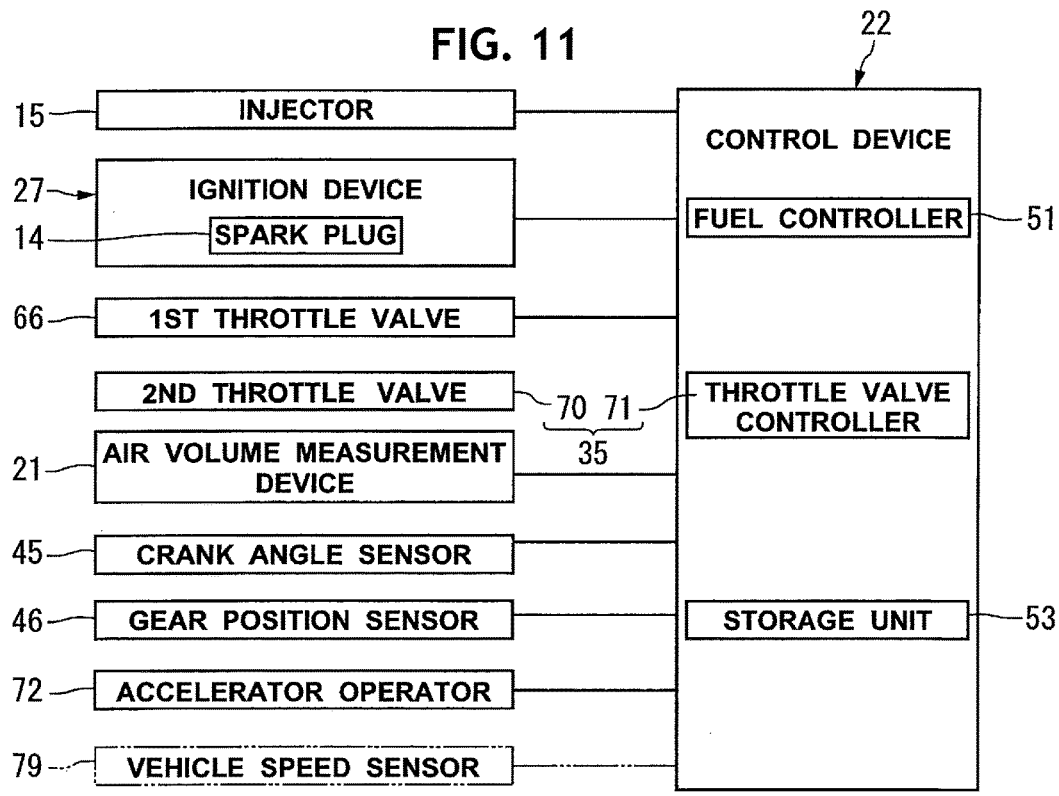
FIG. 11 is a block diagram showing the configuration of a control system of the four-cylinder engine according to the second preferred embodiment of the present invention.

In the second preferred embodiment, the conditions of making the indicated mean effective pressures of two cylinders having an explosion interval of 90° lower than the indicated mean effective pressures of two other cylinders are that the engine speed is smaller than the predetermined value and the load is in the predetermined region. However, the present invention is not limited to this, and the vehicle speed may be added to the conditions. In this case, as explained above, the vehicle speed may be obtained by an arithmetic operation from the engine speed sensed by the crank angle sensor 45 and the gear stage sensed by the gear position sensor 46. As shown in FIG. 11, it is also possible to connect a vehicle speed sensor 79 to the controller 22, and obtain the vehicle speed by using the vehicle speed sensor 76.

Third Preferred Embodiment

As shown in FIGS. 16 to 19, the indicated mean effective pressures of two cylinders having an explosion interval of 90° may be decreased by using an intake device. The same reference numerals as in FIGS. 1 to 15 denote the same or similar members in FIGS. 16 to 19, and a detailed explanation thereof will properly be omitted.

Figure 16:
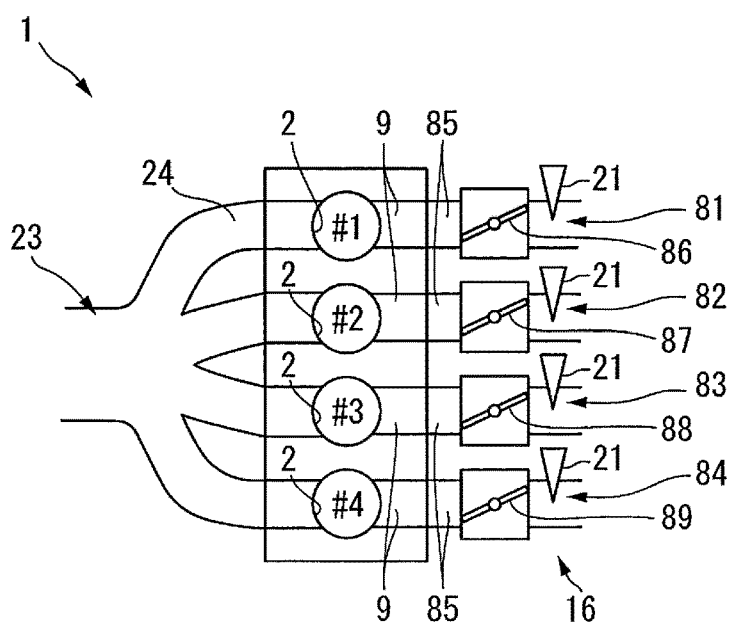
FIG. 16 is a plan view showing the arrangement of an intake device of a four-cylinder engine according to the third preferred embodiment of the present invention.

The differences of a four-cylinder engine 1 shown in FIG. 16 from the four-cylinder engine when using the first preferred embodiment shown in FIGS. 1 to 9 are the configuration of an ignition system and an intake device 16, and the rest of the arrangements are the same. The ignition system of the four-cylinder engine 1 according to the present preferred embodiment improves or optimizes the ignition timings of all cylinders. In the present preferred embodiment, retard control as explained in the above-described first preferred embodiment is not performed.

The intake device 16 of the four-cylinder engine 1 shown in FIG. 16 includes a first intake device 81 for a first cylinder, a second intake device 82 for a second cylinder, a third intake device 83 for a third cylinder, and a fourth intake device 84 for a fourth cylinder. The first to fourth intake devices 81 to 84 respectively include motor-operated throttle valves 86 to 89 connected to intake ports 9 of these cylinders by intake pipes 85. On the intake upstream side of the throttle valves 86 to 89, air volume measurement devices 21 are installed in one-to-one correspondence with the throttle valves 86 to 89.

A throttle valve controller 91 of a controller 22 shown in FIG. 17 controls the operations of the throttle valves 86 to 89.

The throttle valve controller 91 controls the openings of the four throttle valves 86 to 89 based on the operation amount of an accelerator operator 72 operated by an occupant. The openings of the first-cylinder throttle valve 86 and third-cylinder throttle valve 88 increase or decrease in proportion to the operation amount of the accelerator operator 72.

The openings of the second-cylinder throttle valve 87 and fourth-cylinder throttle valve 89 are set to be smaller than those of the first-cylinder throttle valve 86 and third-cylinder throttle valve 88 during an operating state in which an occupant is apt to feel torque fluctuations of the engine, and are matched with those of the first-cylinder throttle valve 86 and third-cylinder throttle valve 88 in other operating states.

The throttle valve controller 91 according to the present preferred embodiment sets the openings of the second-cylinder throttle valve 87 and fourth-cylinder throttle valve 89 by using a map shown in FIG. 18.

In this map shown in FIG. 18, openings $((A-\alpha)°, (B-\beta)°,$ and $(C-\gamma)°)$ which decrease the openings of the second-cylinder throttle valve 87 and fourth-cylinder throttle valve 89 by $\alpha°, \beta°,$ and $\gamma°$ with respect to the openings $(A°, B°, C°,$ and $D°)$ of the first-cylinder throttle valve 86 and third-cylinder throttle valve 88 are allocated to the engine speed and load. This map is provided for each gear stage of a transmission 42, and stored in a storage 53 of the controller 22.

When the openings of the second-cylinder throttle valve 87 and fourth-cylinder throttle valve 89 decrease, the intake air volumes of the second and fourth cylinders decrease, and the indicated mean effective pressures of these cylinders during combustion decrease. A discomfort eliminator 35 according to the present preferred embodiment causes the indicated mean effective pressure to decrease as the intake air volume reduces, and includes the throttle valve controller 91, second-cylinder throttle valve 87, and fourth-cylinder throttle valve 89.

Next, a method of operating the four-cylinder engine according to the present preferred embodiment will be explained. The controller 22 according to the present preferred embodiment operates as shown in a flowchart of FIG. 19. That is, the controller 22 starts the engine in step S1 of the flowchart shown in FIG. 19, advances the process to step S2, and determines whether the engine speed is lower than a predetermined value, and whether the load is in a predetermined region. The predetermined value and predetermined region herein mentioned are a value and region corresponding to an operating state in which an occupant is apt to feel torque fluctuations of the engine, i.e., a value and region requiring control of decreasing the intake air volume. More specifically, in step S2, the controller 22 first reads out the map (FIG. 18) corresponding to the present gear stage from the storage 53. Then, the controller 22 applies the present engine speed and engine load to this map, and reads out an opening which decreases the openings of the second-cylinder throttle valve 87 and fourth-cylinder throttle valve 89 from the map.

If the engine speed and load are in a region indicated by reference symbol D in the map shown in FIG. 18, the process advances from step S2 to step Q1, and all the throttle valves 86 to 89 are driven such that the openings of all the throttle valves 86 to 89 match.

On the other hand, if the engine speed and load are in regions indicated by reference symbols A to C in the map shown in FIG. 18, the process advances from step S2 to step Q2, and the openings of the second-cylinder throttle valve 87 and fourth-cylinder throttle valve 89 are decreased. In this step, the openings of the second-cylinder throttle valve 87 and fourth-cylinder throttle valve 89 are set at the openings $((A-\alpha)°, (B-\beta)°,$ and $(C-\gamma)°)$ read out from the map shown in FIG. 18 and smaller than the openings $(A°, B°, C°,$ and $D°)$ of the first-cylinder throttle valve 86 and third-cylinder throttle valve 88 by $\alpha°, \beta°,$ and $\gamma°$. While the engine is in operation, the controller 22 controls the openings of all the throttle valves 86 to 89 by repetitively performing the above control.

In the four-cylinder engine 1 and the method of operating the four-cylinder engine according to the present preferred embodiment, during an operating state in which an occupant is apt to feel torque fluctuations of the engine because the engine speed is lower than the predetermined value and the load is in the predetermined region, the intake air volumes of two cylinders (the second and fourth cylinders) having an explosion interval of 90° as a crank angle are decreased. Consequently, the indicated mean effective pressures of the two cylinders having an explosion interval of 90° become lower than those of the two other cylinders. Even when using the present preferred embodiment, therefore, the same effect as that when using the first preferred embodiment is obtained.

In the present preferred embodiment, the second intake device 82 and fourth intake device 84 connected to the second and fourth cylinders having an explosion interval of 90° include the throttle valves 87 and 89 provided in one-to-one correspondence with the cylinders. The discomfort eliminator 35 according to the present preferred embodiment controls the openings of the throttle valves 87 and 89 to make the intake air volumes of the two cylinders including an explosion internal of 90° smaller than the intake air volumes of the other cylinders having an explosion interval of not 90°. In the present preferred embodiment, the indicated mean effective pressures of the second and fourth cylinders are decreased by controlling the openings of the second-cylinder throttle valve 87 and fourth-cylinder throttle valve 89, such that the intake air volumes become smaller than those of the first and third cylinders having an explosion interval of not 90°.

In the present preferred embodiment, the throttle valves 87 and 89 provided in one-to-one correspondence with the cylinders reduce the intake air volumes of the second and fourth cylinders during an operating state in which an occupant is liable to feel torque fluctuations of the engine. Therefore, in the four-cylinder engine 1 and the method of operating the four-cylinder engine according to the present preferred embodiment, the indicated mean effective pressures reduce with high responsiveness in the second and fourth cylinders, so an occupant is less likely to feel a sense of discomfort.

The openings of the second-cylinder throttle valve 87 and fourth-cylinder throttle valve 89 according to the present preferred embodiment are preferably the same. However, the present invention is not limited to this. That is, the openings of the second-cylinder throttle valve 87 and fourth-cylinder throttle valve 89 may be different. It is also possible to use an arrangement in which the opening of one of the second-cylinder throttle valve 87 and fourth-cylinder throttle valve 89 matches those of the first-cylinder throttle valve 86 and third-cylinder throttle valve 88, and the opening of the other throttle valve is lower than those of the first-cylinder throttle valve 86 and third-cylinder throttle valve 88.

More specifically, when applying the present preferred embodiment to the four-cylinder engine 1 including the second-cylinder throttle valve 87 and fourth-cylinder throttle valve 89, the discomfort eliminator 35 controls the openings of the throttle valves 87 and 89 to make the intake air volume of at least one of the two cylinders (the second and fourth cylinders) having an explosion interval of 90° smaller than the intake air volumes of the other cylinders (the first and third cylinders) having an explosion interval of not 90°.

To individually control the openings of the throttle valves 87 and 89 as described above, it is possible to use, e.g., a map showing the opening of the second-cylinder throttle valve 87, and a map separate from this map and showing the opening of the fourth-cylinder throttle valve 89.

The use of an arrangement like this makes it possible to individually control the magnitude of torque to be generated when an explosion occurs in the second cylinder, and the magnitude of torque to be generated when an explosion occurs in the fourth cylinder. Accordingly, it is possible to easily make the engine driving energy uniform by using this arrangement.

Modifications of the Third Preferred Embodiment

Figure 21:
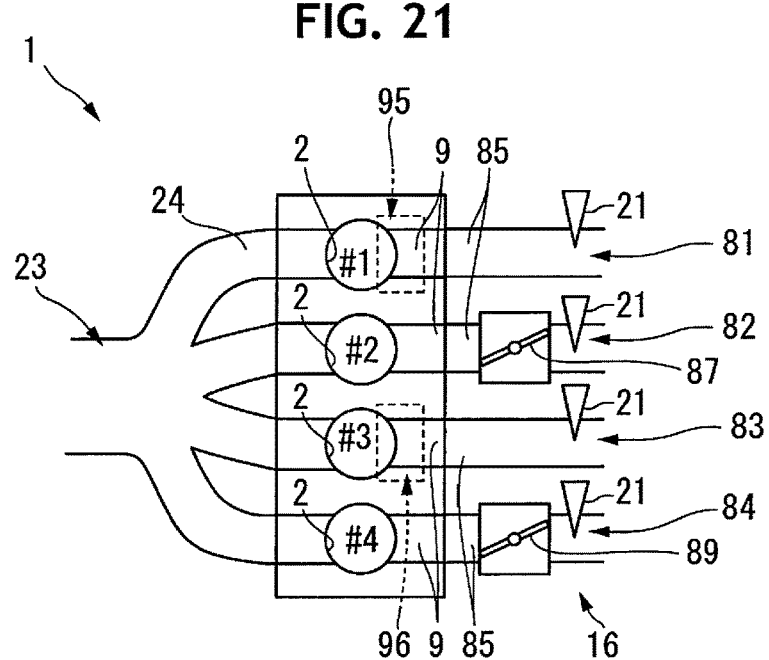
FIG. 21 is a plan view showing the second modification of the intake device according to the third preferred embodiment of the present invention.

When using the arrangement in which air is supplied to the second and fourth cylinders from the throttle valves provided in one-to-one correspondence with these cylinders, the intake devices connected to the first and third cylinders are preferably structured as shown in FIG. 20 (the first modification) and FIG. 21 (the second modification). The same reference numerals as in FIGS. 1 to 19 denote the same or similar members in FIGS. 20 and 21, and a detailed explanation thereof will properly be omitted.

FIG. 20 is a view showing the first modification. Intake ports 9 of the first and third cylinders shown in FIG. 20 are connected to a surge tank 93 by intake pipes 92. A motor-operated or wire-operated throttle valve 94 is installed in one end portion of the surge tank 93. As in the preferred embodiment shown in FIG. 10, the opening of the throttle valve 94 is controlled in proportion to the operation amount of an accelerator operator 72.

FIG. 21 is a view showing the second modification. A first intake device 81 for the first cylinder shown in FIG. 21 includes a first variable valve mechanism 95 for the first cylinder. Also, a third intake device 83 for the third cylinder includes a second variable valve mechanism 96 for the third cylinder. Each of the first variable valve mechanism 95 and the second variable valve mechanism 96 are able to continuously change the opening/closing timings and lift amount of an intake valve 11. That is, the first variable valve mechanism 95 controls the intake air volume of the first cylinder by changing the opening of the intake valve 11 of the first cylinder. The second variable valve mechanism 96 controls the intake air volume of the third cylinder by changing the opening of the intake valve 11 of the third cylinder.

Even when the first and third intake devices 81 and 83 connected to the first and third cylinders are structured as shown in FIGS. 20 and 21, the same effect as that when using the second preferred embodiment is obtained.

In the third preferred embodiment, the conditions of making the indicated mean effective pressures of two cylinders having an explosion interval of 90° lower than those of the two other cylinders are that the engine speed is lower than the predetermined value and the load is in the predetermined region. However, the present invention is not limited to this, and the vehicle speed may be added to the conditions. In this case, as explained above, the vehicle speed may be obtained by an arithmetic operation from the engine speed sensed by the crank angle sensor 45 and the gear stage sensed by the gear position sensor 46. As shown in FIG. 17, it is also possible to connect a vehicle speed sensor 97 to the controller 22, and obtain the vehicle speed by using the vehicle speed sensor 97.

Fourth Preferred Embodiment

As shown in FIGS. 22 to 25, the indicated mean effective pressures of two cylinders having an explosion interval of 90° are able to be decreased by using an intake device. The same reference numerals as in FIGS. 1 to 21 denote the same or similar members in FIGS. 22 to 25, and a detailed explanation thereof will properly be omitted.

The differences of a four-cylinder engine 1 shown in the drawings from the four-cylinder engine when using the first preferred embodiment are the configuration of an ignition system and an intake device 16, and the rest of the arrangements are the same. The ignition system of the four-cylinder engine 1 according to the present preferred embodiment improves or optimizes the ignition timings of all cylinders. The present preferred embodiment does not perform retard control as explained in the above-described first preferred embodiment.

Figure 22:
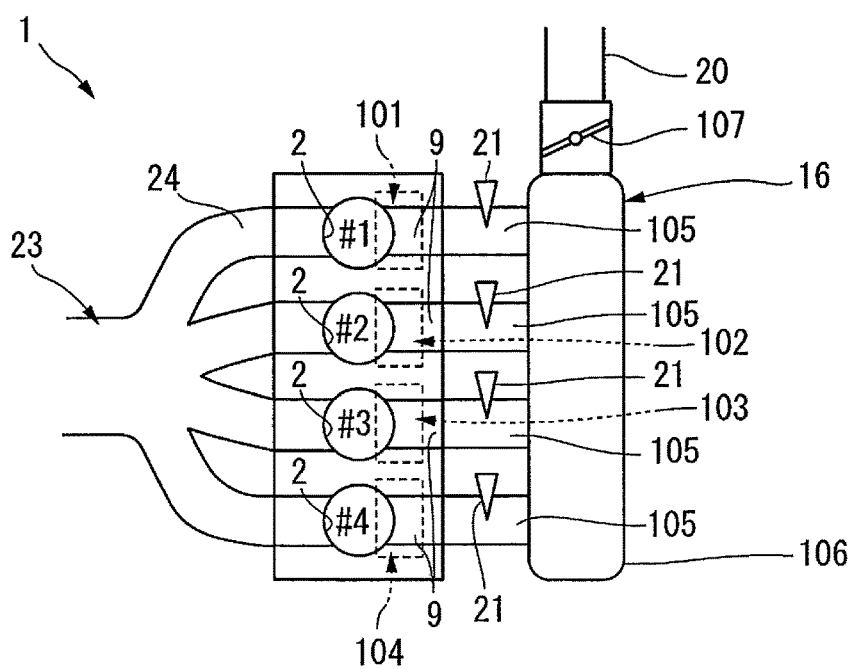
FIG. 22 is a plan view showing the arrangement of an intake device of a four-cylinder engine according to the fourth preferred embodiment of the present invention.

The intake device 16 of the four-cylinder engine 1 shown in FIG. 22 includes variable valve mechanisms 101 to 104 provided in one-to-one correspondence with cylinders, and a surge tank 106 connected to intake ports of the cylinders by intake pipes 105. Each of the variable valve mechanisms 101 to 104 is able to continuously change the opening/closing timings and lift amount of an intake valve 11. That is, the intake air volume of each cylinder is controlled by the variable valve mechanism for the cylinder by changing the opening of the intake valve 11 of the cylinder. An air volume measurement device 21 is installed in the intake pipe 105 of each cylinder.

A throttle valve 107 that controls the intake air volumes of the cylinders in cooperation with the variable valve mechanisms 101 to 104 is provided in one end portion of the surge tank 106. The throttle valve 107 is a motor-operated or wire-operated valve. As in the preferred embodiment shown in FIG. 10, the opening of the throttle valve 107 is controlled in proportion to the operation amount of an accelerator operator 72. Note that the surge tank 106 according to the present preferred embodiment, may be connected to an air cleaner (not shown) without using the throttle valve 107.

Figure 23:
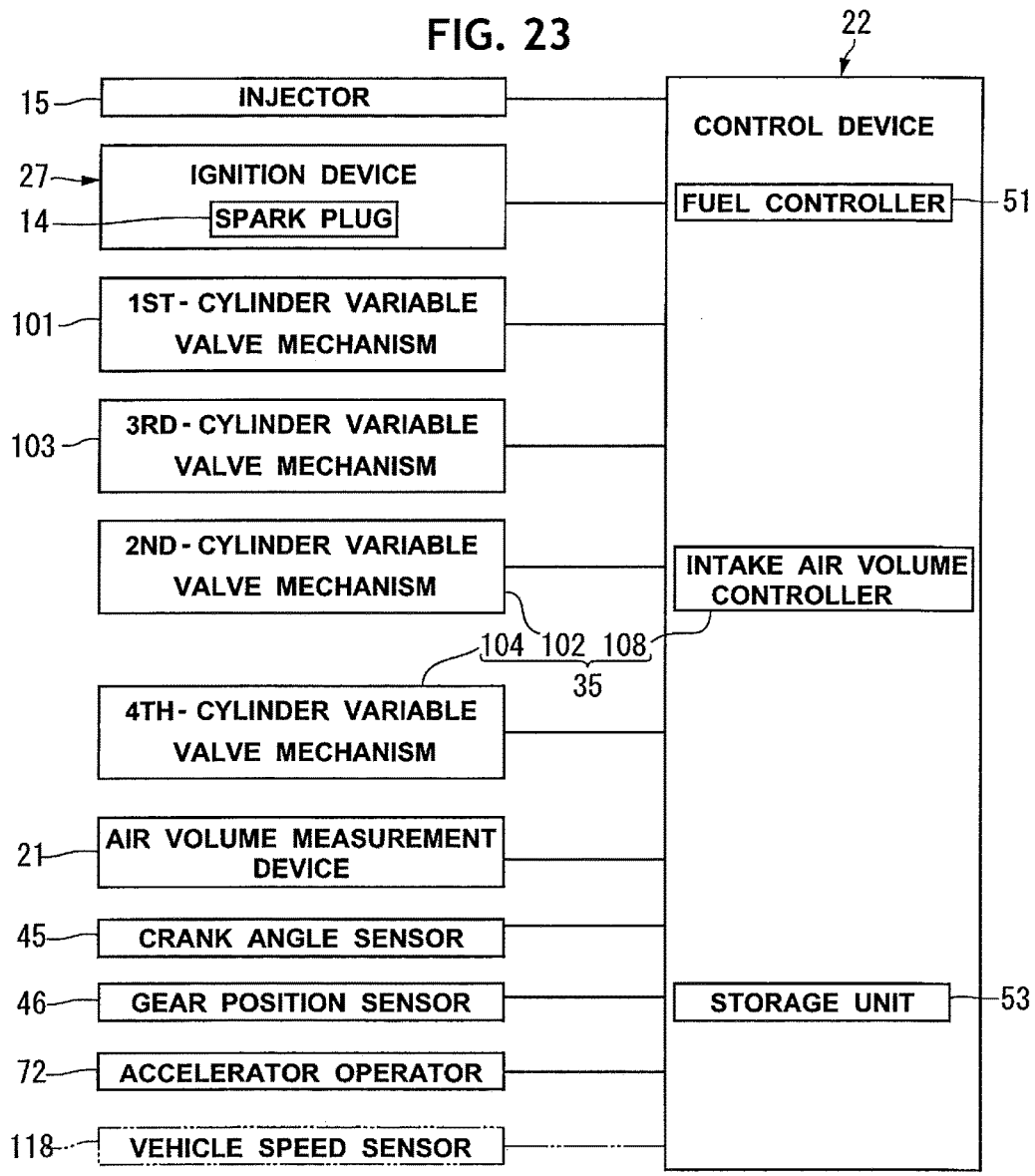
FIG. 23 is a block diagram showing the configuration of a control system of the four-cylinder engine according to a fourth preferred embodiment of the present invention.

An intake air volume controller 108 of a controller 22 shown in FIG. 23 controls the operations of the four variable valve mechanisms 101 to 104.

The intake air volume controller 108 controls the operations of the four variable valve mechanisms 101 to 104 based on the operation amount of the accelerator operator 72 operated by an occupant. The opening/closing timings and lift amount of a first-cylinder intake valve 11 to be changed by the first-cylinder variable valve mechanism 101 and the opening/closing timings and lift amount of the third-cylinder intake valve 11 to be changed by the third-cylinder variable valve mechanism 103 increase or decrease in proportion to the operation amount of the accelerator operator 72. The opening/closing timings and lift amount of the intake valve 11 will simply be referred to as "the opening" hereinafter.

The openings of the second-cylinder intake valve 11 and fourth-cylinder intake valve 11 are set to be smaller than the openings of the first-cylinder intake valve 11 and third-cylinder intake valve 11 during an operating state in which an occupant is apt to feel torque fluctuations of the engine, and matched with the openings of the first-cylinder intake valve 11 and the third-cylinder intake valve 11 in other operating states.

Figure 24:
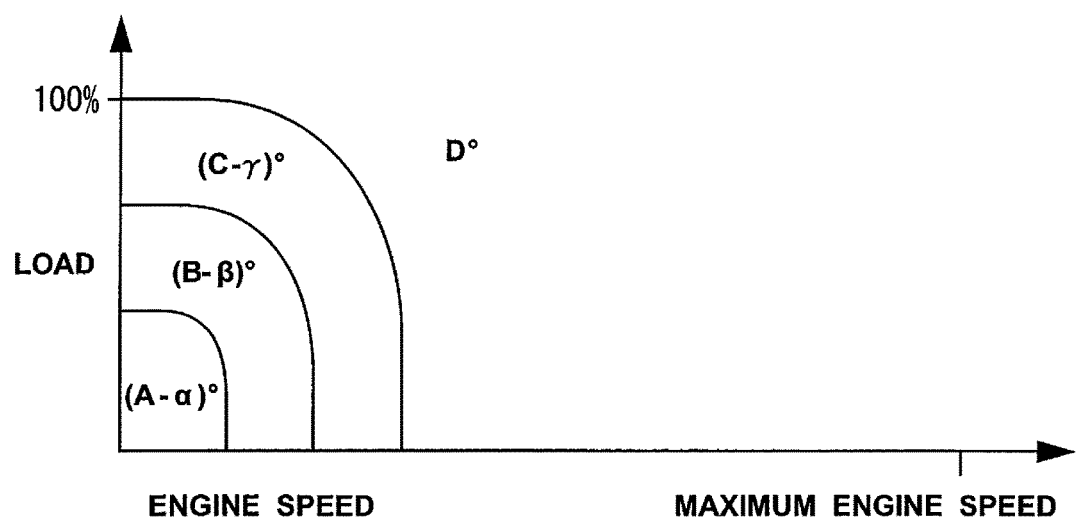
FIG. 24 is a map showing the intake valve openings of second and fourth cylinders according to the fourth preferred embodiment of the present invention.
Figure 25:
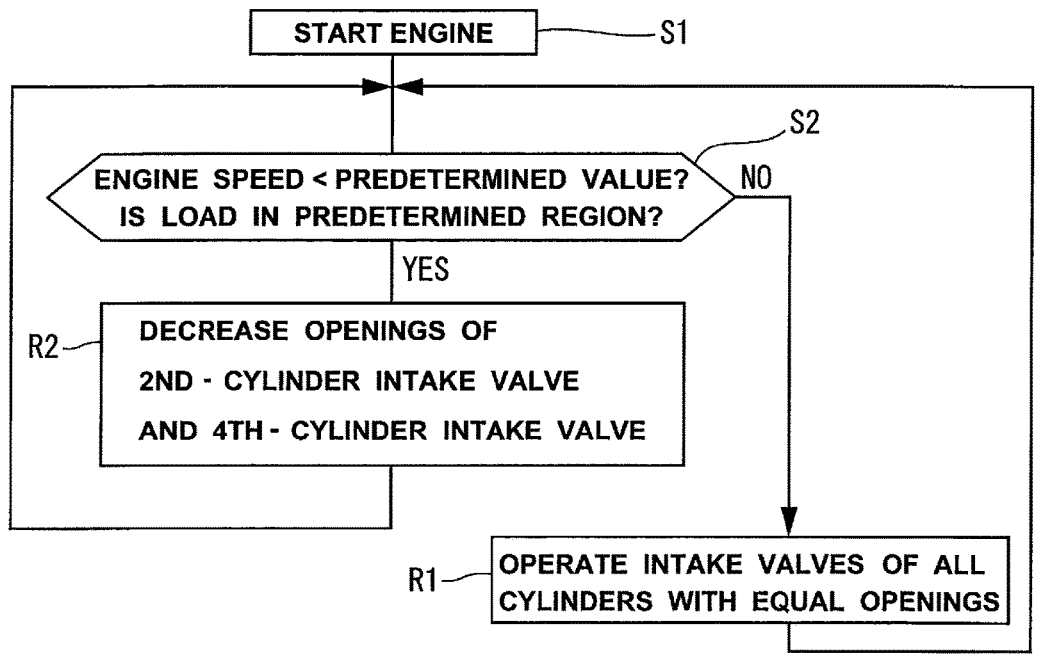
FIG. 25 is a flowchart for explaining the operation of a controller (a method of operating the four-cylinder engine) according to the fourth preferred embodiment of the present invention.

The intake air volume controller 108 according to the present preferred embodiment sets the openings of the second-cylinder intake valve 11 and fourth-cylinder intake valve 11 by using a map shown in FIG. 24.

In this map shown in FIG. 24, openings ((A−α)°, (B−β)°, and (C−γ)°) which decrease the openings of the second-cylinder intake valve 11 and fourth-cylinder intake valve 11 by α°, β°, and γ° with respect to the openings (A°, B°, C°, and D°) of the first-cylinder intake valve 11 and the third-cylinder intake valve 11 are allocated to the engine speed and load. This map is provided for each gear stage of a transmission 42, and stored in a storage 53 of the controller 22.

When the openings of the second-cylinder intake valve 11 and fourth-cylinder intake valve 11 decrease, the intake air volumes of the second and fourth cylinders decrease, and the indicated mean effective pressures of these cylinders during combustion decrease. A discomfort eliminator 35 according to the present preferred embodiment causes the indicated mean effective pressure to decrease as the intake air volume reduces, and includes the intake air volume controller 108, second-cylinder variable valve mechanism 102, and fourth-cylinder variable valve mechanism 104.

Next, a method of operating the four-cylinder engine according to the present preferred embodiment will be explained. The controller 22 according to the present preferred embodiment operates as shown in a flowchart of FIG. 25. That is, the controller 22 starts the engine in step S1 of the flowchart shown in FIG. 25, advances the process to step S2, and determines whether the engine speed is lower than a predetermined value, and whether the load is in a predetermined region. The predetermined value and predetermined region herein mentioned are a value and region corresponding to an operating state in which an occupant is apt to feel torque fluctuations of the engine, i.e., a value and region requiring control of decreasing the intake air volume.

More specifically, in step S2, the controller 22 first reads out the map (FIG. 24) corresponding to the present gear stage from the storage 53. Then, the controller 22 applies the present engine speed and engine load to this map, and reads out an opening which decreases the openings of the second-cylinder intake valve 11 and fourth-cylinder intake valve 11 from the map.

If the engine speed and load are in a region indicated by reference symbol D in the map shown in FIG. 24, the process advances from step S2 to step R1, and all the variable valve mechanisms 101 to 104 are driven such that the openings of all the intake valves 11 match.

On the other hand, if the engine speed and load are in regions indicated by reference symbols A to C in the map shown in FIG. 24, the process advances from step S2 to step R2, and the openings of the second-cylinder intake valve 11 and fourth-cylinder intake valve 11 are decreased. In this step, the openings of the second-cylinder intake valve 11 and fourth-cylinder intake valve 11 are set at the openings ((A−α)°, (B−β)°, and (C−γ)°) read out from the map shown in FIG. 24 and smaller than the openings (A°, B°, C°, and D°) of the first-cylinder intake valve 11 and the third-cylinder intake valve 11 by α°, β°, and γ°. While the engine is in operation, the controller 22 controls the openings of all the variable valve mechanisms 101 to 104 by repetitively performing the above control.

In the four-cylinder engine 1 and the method of operating the four-cylinder engine according to the present preferred embodiment, during an operating state in which an occupant is apt to feel torque fluctuations of the engine because the engine speed is lower than the predetermined value and the load is in the predetermined region, the intake air volumes of two cylinders (the second and fourth cylinders) having an explosion interval of 90° as a crank angle reduce, and the indicated mean effective pressures are made lower than those of the two other cylinders. Even when using the present preferred embodiment, therefore, the same effect as that when using the first preferred embodiment is obtained.

In the present preferred embodiment, the intake device 16 connected to the second and fourth cylinders having an explosion interval of 90° include the variable valve mechanisms 102 and 104 that are able to control the openings of the intake valves 11. The discomfort eliminator 35 according to the present preferred embodiment controls the operations of the variable valve mechanisms 102 and 104 to make the intake air volumes of the two cylinders including an explosion internal of 90° smaller than the intake air volumes of the other cylinders having an explosion interval of not 90°. In the present preferred embodiment, the indicated mean effective pressures of the second and fourth cylinders are decreased by controlling the openings of the second-cylinder intake valve 11 and the fourth-cylinder intake valve 11, such that the intake air volumes become smaller than those of the first and third cylinders having an explosion interval of not 90°.

In the present preferred embodiment, the variable valve mechanisms 102 and 104 provided in one-to-one correspondence with the cylinders reduce the intake air volumes of the second and fourth cylinders during an operating state in which an occupant is liable to feel torque fluctuations of the engine. Therefore, in the four-cylinder engine 1 and the method of operating the four-cylinder engine according to the present preferred embodiment, the indicated mean effective pressures reduce with high responsiveness in the second and fourth cylinders so that an occupant is less likely to feel a sense of discomfort.

The openings of the second-cylinder intake valve 11 and fourth-cylinder intake valve 11 according to the present preferred embodiment are the same. However, the present invention is not limited to this. That is, the openings of the second-cylinder intake valve 11 and fourth-cylinder intake valve 11 may be different. It is also possible to use an arrangement in which the opening of one of the second-cylinder intake valve 11 and the fourth-cylinder intake valve 11 matches those of the first-cylinder intake valve 11 and the third-cylinder intake valve 11, and the opening of the other intake valve 11 is lower than those of the first-cylinder intake valve 11 and the third-cylinder intake valve 11.

More specifically, when applying the present preferred embodiment to the four-cylinder engine 1 including the second-cylinder variable valve mechanism 102 and the fourth-cylinder variable valve mechanism 104, the discomfort eliminator 35 controls the operations of the variable valve mechanisms 102 and 104 to make the intake air volume of at least one of the two cylinders (the second and fourth cylinders) having an explosion interval of 90° smaller than the intake air volumes of the other cylinders (the first and third cylinders) having an explosion interval of not 90°.

To individually control the openings of the intake valves 11 as described above, it is possible to use, e.g., a map showing the opening of the second-cylinder intake valve 11, and a map separate from this map and showing the opening of the fourth-cylinder intake valve 11.

The use of an arrangement like this makes it possible to individually control the magnitude of torque to be generated when an explosion occurs in the second cylinder, and the magnitude of torque to be generated when an explosion occurs in the fourth cylinder. Accordingly, it is possible to easily make the engine driving energy uniform by using this arrangement.

Modifications of Fourth Preferred Embodiment

Figure 26:
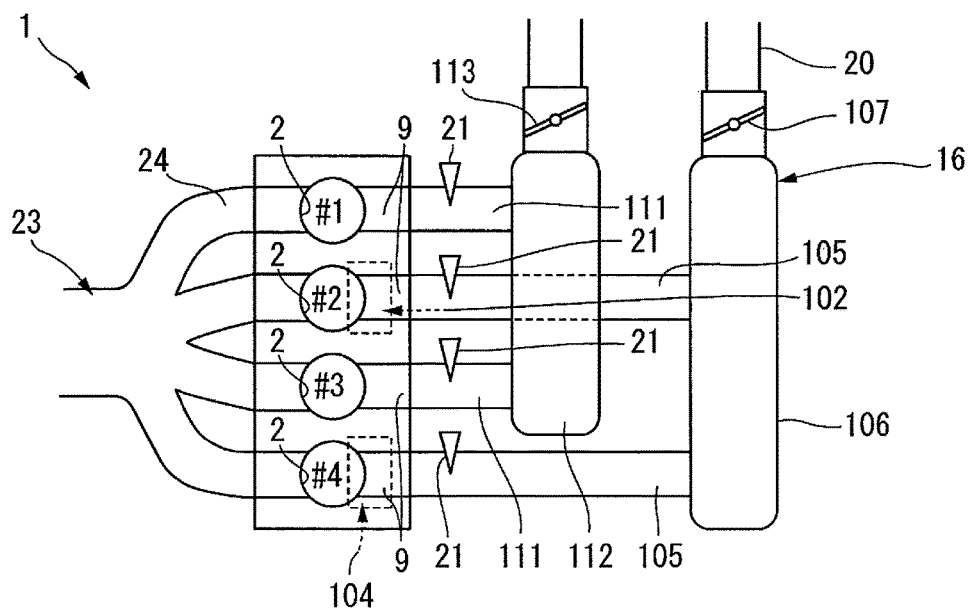
FIG. 26 is a plan view showing the first modification of the intake device according to the fourth preferred embodiment of the present invention.
Figure 27:
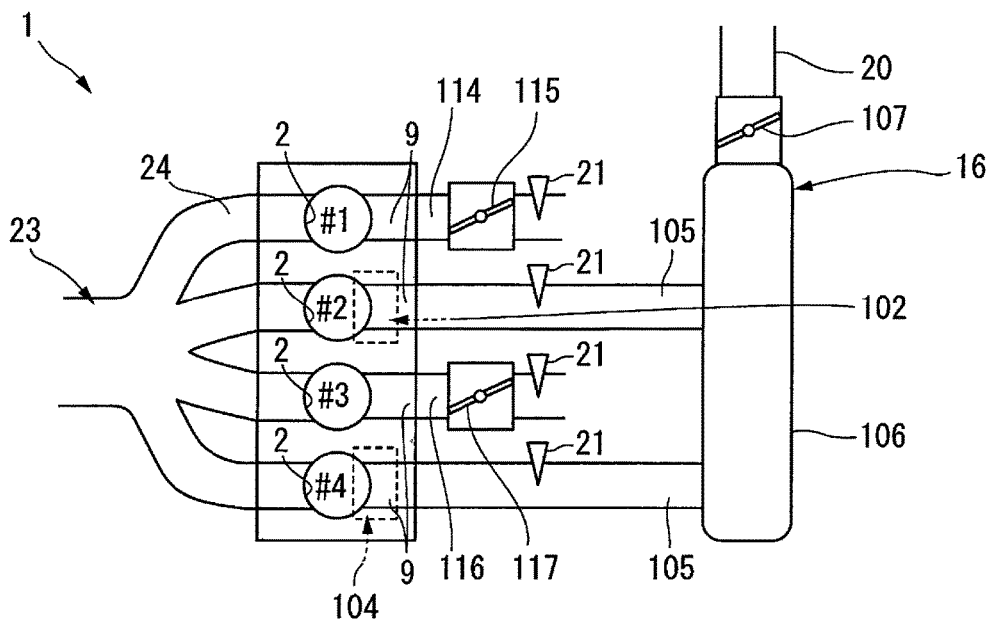
FIG. 27 is a plan view showing the second modification of the intake device according to the fourth preferred embodiment of the present invention.
Figure 28:
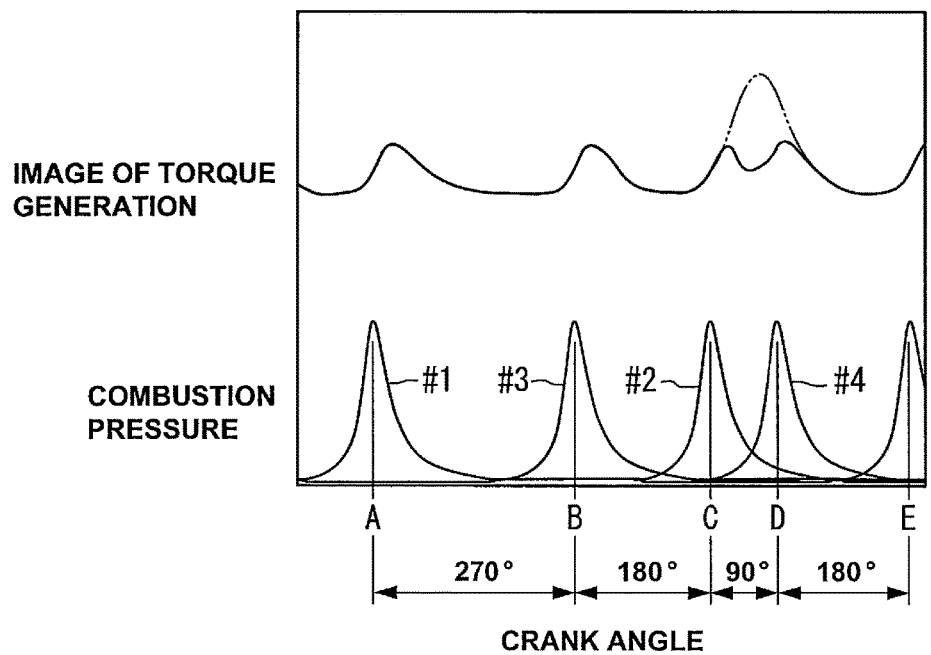
FIG. 28 is a graph showing changes in combustion pressure and generated torque with respect to a crank angle in a conventional four-cylinder engine.

When the variable valve mechanisms are provided in one-to-one correspondence with the second and fourth cylinders, the intake device connected to the first and third cylinders may be structured as shown in FIG. 26 (the first modification) and FIG. 27 (the second modification). The same reference numerals as in FIGS. 1 to 25 denote the same or similar members in FIGS. 26 and 27, and a detailed explanation thereof will properly be omitted.

FIG. 26 is a view showing the first modification. Intake ports 9 of the first and third cylinders shown in FIG. 26 are connected to a surge tank 112 by intake pipes 111. A motor-operated or wire-operated throttle valve 113 is installed in one end portion of the surge tank 112. As in the preferred embodiment shown in FIG. 10, the opening of the throttle valve 113 is controlled in proportion to the operation amount of an accelerator operator 72.

FIG. 27 is a view showing the second modification. As shown in FIG. 27, a first-cylinder throttle valve 115 is connected to a first-cylinder intake port 9 by an intake pipe 114. A third-cylinder throttle valve 117 is connected to a third-cylinder intake port 9 by an intake pipe 116. As the throttle valves 115 and 117, it is possible to use a motor-operated valve, or a valve connected to the accelerator operator 72 by an operating wire (not shown). The first-cylinder throttle valve 115 and third-cylinder throttle valve 117 operate in synchronism with each other so as to have the same opening. Also, the openings of the first-cylinder throttle valve 115 and third-cylinder throttle valve 117 increase or decrease in proportion to the operation amount of the accelerator operator 72.

Even when the intake device to be connected to the first and third cylinders is configured as shown in FIGS. 26 and 27, the same effect as that when using the fourth preferred embodiment is obtained.

In each of the above-described preferred embodiments, the example in which the discomfort eliminator 35 uses the map when decreasing the indicated mean effective pressures of the second and fourth cylinders has been explained. However, the present invention is not limited to this. That is, the operation amounts of the actuators (e.g., the ignition device 27, throttle valves, and variable valve mechanisms) to decrease the indicated mean effective pressures of the second and fourth cylinders may be obtained by an arithmetic operation alone.

Also, in each of the above-described preferred embodiments, the four-cylinder engine 1 in which two cylinders having an explosion interval of 90° as a crank angle are the second and fourth cylinders is disclosed. However, when the positions of the crank pins 31 to 34 are different from those of the crankshaft 8 shown in FIG. 3, the two cylinders having an explosion interval of 90° are not necessarily the second and fourth cylinders. When carrying out various preferred embodiments of the present invention, therefore, the indicated mean effective pressures of the two cylinders having an explosion interval of 90° as a crank angle are decreased during an operating state in which an occupant tends to feel torque fluctuations of the engine, regardless of the positions of the crank pins 31 to 34.

Furthermore, in the four-cylinder engine 1 disclosed in each of the above-described preferred embodiments, all the cylinders are preferably arranged in a line in the axial direction of the crankshaft 8. However, the present invention is not limited to this. That is, the present invention can be applied to a V-type four-cylinder engine. In a V-type four-cylinder engine in which explosion intervals are 270°, 180°, 90°, and 180° as crank angles, an angle defined by the cylinder axis of one cylinder bank and that of the other cylinder bank is 90° when viewed in the axial direction of the crankshaft. Also, the crankshaft used in this 90° V-type engine preferably is a one-plane-type crankshaft, for example.

In the fourth preferred embodiment, the conditions of making the indicated mean effective pressures of two cylinders having an explosion interval of 90° lower than the indicated mean effective pressures of the other two cylinders are that the engine speed is smaller than the predetermined value and the load is in the predetermined region. However, the present invention is not limited to this, and the vehicle speed may be added to the conditions. In this case, as explained above, the vehicle speed may be obtained by an arithmetic operation from the engine speed sensed by the crank angle sensor 45 and the gear stage sensed by the gear position sensor 46. As shown in FIG. 23, it is also possible to connect a vehicle speed sensor 118 to the controller 22, and obtain the vehicle speed by using the vehicle speed sensor 118.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An engine comprising:
   a cylinder body including a plurality of cylinder holes;
   a cylinder head attached to the cylinder body and including intake ports and exhaust ports for respective ones of the plurality of cylinder holes;
   spark plugs attached to the cylinder head for the respective ones of the plurality of cylinder holes;
   an ignition device including the spark plugs;
   an intake device connected to the intake ports;
   an exhaust device connected to the exhaust ports;
   a plurality of pistons slidably fitted in the respective ones of the plurality of cylinder holes; and
   a crankshaft connected to the pistons by connecting rods; wherein
   explosion intervals of a plurality of cylinders defined by the plurality of cylinder holes are 270°, 180°, 90°, and 180° as crank angles; and
   the engine further includes a discomfort eliminator which, when an engine speed is lower than a predetermined value, causes an indicated mean effective pressure of at least one of two cylinders having an explosion interval of 90° to be lower than indicated mean effective pressures of other cylinders having an explosion interval of not 90°.

2. The engine according to claim 1, wherein an amount of decrease in the indicated mean effective pressure increases as the engine speed decreases and a load on the engine increases.

3. The engine according to claim 1, wherein the discomfort eliminator causes the indicated mean effective pressure to decrease when an ignition timing is delayed, and delays an ignition timing of at least one of the two cylinders having an explosion interval of 90° from ignition timings of the other cylinders having an explosion interval of not 90°.

4. The engine according to claim 1, wherein
the intake device that is connected to the two cylinders having an explosion interval of 90° includes a surge tank connected to the intake ports of the two cylinders, and a throttle valve for the surge tank; and
the discomfort eliminator causes the indicated mean effective pressure to decrease when an intake air volume reduces, and causes intake air volumes of the two cylinders having an explosion interval of 90° to be smaller than intake air volumes of the other cylinders having an explosion interval of not 90° by controlling an opening of the throttle valve.

5. The engine according to claim 1, wherein
the intake device connected to the two cylinders having an explosion interval of 90° includes throttle valves for the respective cylinders; and
the discomfort eliminator causes the indicated mean effective pressure to decrease when an intake air volume reduces, and causes an intake air volume of at least one of the two cylinders having an explosion interval of 90° to be smaller than intake air volumes of the other cylinders having an explosion interval of not 90° by controlling openings of the throttle valves.

6. The engine according to claim 1, wherein
the intake device connected to the two cylinders having an explosion interval of 90° includes a variable valve mechanism that changes opening/closing timings and a lift amount of an intake valve to open/close the intake ports; and
the discomfort eliminator causes the indicated mean effective pressure to decrease when an intake air volume reduces, and causes an intake air volume of at least one of the two cylinders having an explosion interval of 90° to be smaller than intake air volumes of the other cylinders having an explosion interval of not 90° by controlling an operation of the variable valve mechanism.

7. A method of operating an engine, comprising:
setting explosion intervals at 270°, 180°, 90°, and 180° as crank angles in the engine, the engine including:
a cylinder body including a plurality of cylinder holes;
a cylinder head attached to the cylinder body and including intake ports and exhaust ports for respective ones of the plurality of cylinder holes;
spark plugs attached to the cylinder head for the respective ones of the plurality of cylinder holes;
an ignition device including the spark plugs;
an intake device connected to the intake ports;
an exhaust device connected to the exhaust ports;
a plurality of pistons slidably fitted in the respective cylinder holes; and
a crankshaft connected to the pistons by connecting rods; and
causing an indicated mean effective pressure of at least one of two cylinders having an explosion interval of 90° to be lower than indicated mean effective pressures of other cylinders having an explosion interval of not 90° when an engine speed is lower than a predetermined value.

8. The method of operating an engine according to claim 7, wherein an amount of decrease in the indicated mean effective pressure increases as the engine speed decreases and a load on the engine increases.

9. The method of operating an engine according to claim 7, wherein an ignition timing of at least one of the two cylinders having an explosion interval of 90° is delayed from ignition timings of the other cylinders having an explosion interval of not 90° to decrease the indicated mean effective pressure of at least one of the two cylinders having an explosion interval of 90°.

10. The method of operating an engine according to claim 7, wherein
the intake device connected to the two cylinders having an explosion interval of 90° includes a surge tank connected to the intake ports of the two cylinders, and a throttle valve provided for the surge tank; and
intake air volumes of the two cylinders having an explosion interval of 90° are made smaller than intake air volumes of the other cylinders having an explosion interval of not 90° by controlling an opening of the throttle valve to decrease the indicated mean effective pressures of the two cylinders having an explosion interval of 90°.

11. The method of operating an engine according to claim 7, wherein
the intake device connected to the two cylinders having an explosion interval of 90° includes throttle valves for the respective ones of the plurality of cylinders; and
an intake air volume of at least one of the two cylinders having an explosion interval of 90° is made smaller than intake air volumes of the other cylinders having an explosion interval of not 90° by controlling openings of the throttle valves to decrease the indicated mean effective pressure of at least one of the two cylinders having an explosion interval of 90°.

12. The method of operating an engine according to claim 7, wherein
the intake device connected to the two cylinders having an explosion interval of 90° includes a variable valve mechanism that changes opening/closing timings and a lift amount of an intake valve to open/close the intake ports; and
an intake air volume of at least one of the two cylinders having an explosion interval of 90° is made smaller than intake air volumes of the other cylinders having an explosion interval of not 90° by controlling an operation of the variable valve mechanism to decrease the indicated mean effective pressure of at least one of the two cylinders having an explosion interval of 90°.

* * * * *